United States Patent
Hwang

(10) Patent No.: US 11,514,323 B1
(45) Date of Patent: Nov. 29, 2022

(54) METHODS FOR PERFORMING MULTI-VIEW OBJECT DETECTION BY USING HOMOGRAPHY ATTENTION MODULE AND DEVICES USING THE SAME

(71) Applicant: Deeping Source Inc., Seoul (KR)

(72) Inventor: Jin Woo Hwang, Seoul (KR)

(73) Assignee: DEEPING SOURCE INC., Seoul (KR)

( * ) Notice: Subject to any disclaimer, the term of this patent is extended or adjusted under 35 U.S.C. 154(b) by 0 days.

(21) Appl. No.: 17/837,604

(22) Filed: Jun. 10, 2022

(30) Foreign Application Priority Data

May 30, 2022 (EP) .................................... 22176028

(51) Int. Cl.
  *G06N 3/08* (2006.01)
  *G06V 10/82* (2022.01)
  *G06V 10/77* (2022.01)
  *G06V 10/771* (2022.01)

(52) U.S. Cl.
  CPC ............. *G06N 3/08* (2013.01); *G06V 10/771* (2022.01); *G06V 10/7715* (2022.01); *G06V 10/82* (2022.01)

(58) Field of Classification Search
  CPC .... G06N 3/08; G06V 10/771; G06V 10/7715; G06V 10/82
  See application file for complete search history.

(56) References Cited

U.S. PATENT DOCUMENTS

| | | | | |
|---|---|---|---|---|
| 2010/0194886 | A1* | 8/2010 | Asari | G06T 7/85 348/148 |
| 2018/0349785 | A1* | 12/2018 | Zheng | G05D 1/0088 |
| 2019/0026568 | A1* | 1/2019 | Kario | G05D 1/0246 |
| 2020/0387718 | A1* | 12/2020 | Chan | G06V 10/82 |

OTHER PUBLICATIONS

Xu, Jianfeng, and Kazuyuki Tasaka. "Keep your eye on the ball: Detection of kicking motions in multi-view 4k soccer videos." ITE Transactions on Media Technology and Applications 8.2 (2020): 81-88. (Year: 2020).*
Chen, He, et al. "Multi-person 3d pose estimation in crowded scenes based on multi-view geometry." European Conference on Computer Vision. Springer, Cham, 2020. (Year: 2020).*
Dai, Zhirui, et al. "BEV-Net: Assessing Social Distancing Compliance by Joint People Localization and Geometric Reasoning." Proceedings of the IEEE/CVF International Conference on Computer Vision. 2021. (Year: 2021).*

* cited by examiner

*Primary Examiner* — Fayyaz Alam
(74) *Attorney, Agent, or Firm* — Amster, Rothstein & Ebenstein LLP

(57) ABSTRACT

A method for training a homography attention module (HAM) to perform multi-view object detection includes steps of: generating, from an i-th feature map corresponding to each of multiple training images representing multi-views of a target space, a 1-st to a d-th channel attention map for determining channel attention scores each channel included in the i-th feature map has for each of a 1-st to a d-th height plane of the target space, generating a 1-st to a d-th channel refined feature map by referring to channels with top k channel attention scores for each height, element-wisely multiplying them with corresponding spatial attention map generated therefrom to produce a 1-st to a d-th spatial refined feature map, and then homographically transforming them onto corresponding height plane and aggregating them to generate a BEV occupancy heatmap, which is used with its GT for training.

22 Claims, 13 Drawing Sheets

FIG. 10

| METHOD | WILDTRACK | | | | MULTIVIEW X | | | |
|---|---|---|---|---|---|---|---|---|
| | MODA | MODP | PRECISION | RECALL | MODA | MODP | PRECISION | RECALL |
| MVDET | 88.2 | 75.7 | 94.7 | 93.6 | 83.9 | 79.6 | 96.8 | 86.7 |
| MVDET + HAM | 89.4 | 75.7 | 95.2 | 94.1 | 86.9 | 81.8 | 98.6 | 88.2 |
| SHOT | 90.2 | 76.5 | 96.1 | 94.0 | 88.3 | 82.0 | 96.6 | 91.5 |
| SHOT + HAM | 90.5 | 77.8 | 96.2 | 94.2 | 90.6 | 82.2 | 96.8 | 93.8 |
| MVDETR | 91.5 | 82.1 | 97.4 | 94.0 | 93.7 | 91.3 | 99.5 | 94.2 |
| MVDETR + HAM | 92.4 | 82.9 | 97.2 | 95.2 | 94.2 | 91.4 | 99.5 | 94.6 |
| BOOSTER-SHOT + TR | 92.0 | 82.5 | 96.8 | 95.2 | 94.1 | 91.7 | 98.3 | 95.7 |
| BOOSTER-SHOT | 92.9 | 82.6 | 96.5 | 96.3 | 94.2 | 91.9 | 99.5 | 94.6 |

FIG. 11A

| METHOD | #H | MULTIVIEW X | | | |
|---|---|---|---|---|---|
| | | MODA | MODP | PRECISION | RECALL |
| SHOT | 5 | 88.3 | 82.0 | 96.6 | 91.5 |
| SHOT + HAM | 2 | 89.4 | 80.8 | 95.2 | 94.2 |
| SHOT + HAM | 4 | 90.6 | 82.2 | 96.8 | 93.8 |
| SHOT + HAM | 6 | 91.4 | 83.1 | 97.4 | 93.9 |
| SHOT + HAM | 8 | 91.4 | 82.6 | 97.5 | 93.8 |

FIG. 11B

| METHOD | K | MULTIVIEW X | | | |
|---|---|---|---|---|---|
| | | MODA | MODP | PRECISION | RECALL |
| SHOT + HAM | 4 | 90.6 | 81.8 | 97.7 | 92.7 |
| SHOT + HAM | 8 | 90.4 | 82.2 | 97.9 | 92.4 |
| SHOT + HAM | 16 | 91.8 | 82.6 | 98.9 | 92.9 |
| SHOT + HAM | 32 | 90.6 | 82.2 | 96.8 | 93.8 |
| SHOT + HAM | 64 | 90.2 | 82.2 | 96.9 | 93.2 |
| SHOT + HAM | 128 | 89.2 | 81.8 | 96.0 | 93.0 |

FIG. 12

| METHOD | WILDTRACK | | | |
|---|---|---|---|---|
| | MODA | MODP | PRECISION | RECALL |
| MVDET | 88.2 | 75.7 | 94.7 | 93.6 |
| MVDET + CHANNEL GATE | 88.8 | 76.0 | 95.1 | 93.6 |
| MVDET + SPATIAL GATE | 88.6 | 76.6 | 95.5 | 93.0 |
| MVDET + HAM | 89.4 | 75.7 | 95.2 | 94.1 |

METHODS FOR PERFORMING MULTI-VIEW OBJECT DETECTION BY USING HOMOGRAPHY ATTENTION MODULE AND DEVICES USING THE SAME

CROSS REFERENCE OF RELATED APPLICATION

This present application claims the benefit of the earlier filing date of European Patent Application No. 22176028.3, filed May 30, 2022, the entire contents of which being incorporated herein by reference.

FIELD OF THE DISCLOSURE

The present disclosure relates to methods for aggregating multi-view object detections by using a homography attention module and devices using the same; and more particularly, to the methods for the homography attention module to (i) perform at least one channel attention and at least one spatial attention on images or video frames, obtained concurrently from a plurality of cameras photographing a target space from different angles from each other, (ii) homographically transform attention maps produced therefrom onto at least one height plane to thereby produce projected feature maps, corresponding to each of the plurality of the cameras, and then (iii) aggregate the projected feature maps by a BEV (Bird's Eye View) heatmap generator to detect objects located in the target space and thus generate a BEV occupancy heatmap, and devices using the same.

BACKGROUND OF THE DISCLOSURE

Multi-view detection leverages multiple camera views for object detection by using synchronized input images captured from varying view angles. Compared to carrying out object detection using a single-view camera setup, a multi-view camera setup alleviates the occlusion issue that often rises as one of the fundamental problems in computer vision applications. While it is difficult to detect objects like pedestrians from images obtained from the single-view camera setup alone due to problems such as crowded scenes and occlusions, images obtained from capturing a scene from multiple view angles are able to include richer information on the surroundings.

As a means to perform the multi-view detection, multi-view aggregation that produces a bird's eye view representation of a target space with detected objects by using images obtained from a plurality of cameras capturing the target space at various view angles is often implemented. Recently, various attempts have been made to improve the accuracy of the multi-view detection by performing the multi-view aggregation through deep learning.

As one example of conventional technologies, MVDet (Hou, Y., Zheng, L., & Gould, S. (2020, August). Multiview detection with feature perspective transformation. In European Conference on Computer Vision (pp. 1-18). Springer, Cham.) proposes a fully convolutional end-to-end trainable solution for performing the multi-view detection. MVDet aggregates different views by projecting convolution feature maps onto a ground plane, i.e., a single plane, via homography transformation and then by concatenating multiple projected feature maps produced therefrom. Upon this aggregation, MVDet applies convolutional layers to detect pedestrians on the scene.

Further, another conventional technology named MVDeTr (Hou, Y., Zheng, L.: Multiview detection with shadow transformer (and view-coherent data augmentation). In: ACM International Conference on Multimedia (2021)) enhances MVDet by introducing a shadow transformer to tackle distortions that occurred during the multi-view aggregation. Herein, the shadow transformer attends differently at different positions on multiple camera views, i.e., multi-views, to deal with various shadow-like distortions caused as a result of projecting each of multi-view images onto a ground plane. Additionally, MVDeTr performs random data augmentation while maintaining view-consistency requirements, i.e., maintaining locations of original objects in the multi-view images and preserving coherencies of feature distributions around the original objects, to generate augmented images and perform the multi-view aggregation on the augmented images to thereby use the outputs therefrom for further training.

Meanwhile, as yet another technology, SHOT (Song, L., Wu, J., Yang, M., Zhang, Q., Li, Y., & Yuan, J. (2021). Stacked Homography Transformations for Multi-View Pedestrian Detection. In Proceedings of the IEEE/CVF International Conference on Computer Vision (pp. 6049-6057).) has discovered that projecting the multi-view images onto a single ground plane experiences drop in its accuracy due to misalignments. Accordingly, SHOT is driven from its motivation that each pixel from the multi-view images should be projected onto a plane at a proper height and thus performs homography transformations onto various heights other than the ground plane alone. Thereafter, SHOT assign likelihood scores for transformation to each height on each pixel and then performs aggregation to better approximate locations of each object. In particular, SHOT uses a neural-network based soft-selection module to predict a likelihood map that assigns each pixel on features extracted from the multi-view images to one of the homography transformations.

However, in order to accurately match the features extracted from different view angles through the means of multi-view aggregation, it is necessary to take into account changes in viewpoints or the problem of occlusions resulting from various view angles. Also, while performing an accurate multi-view aggregation requires a considerable amount of computational load and training, one should take into consideration that not all features extracted from every single view angle are equally useful for performing the accurate multi-view aggregation.

Therefore, an enhanced method for solving the aforementioned problems is required.

SUMMARY OF THE DISCLOSURE

It is an object of the present disclosure to solve all the aforementioned problems.

It is another object of the present disclosure to perform channel attention on images obtained from a plurality of cameras that capture a target space from a plurality of view angles different from each other, prior to homographically transforming the images to planes at multiple heights, wherein, as the channel attention, each channel attention score each of multiple channels included in the images has for each homography transformation onto each height is determined.

It is still another object of the present disclosure to perform spatial attention in addition to the channel attention on the images obtained from the plurality of the view angles by using a homography attention module.

It is still yet another object of the present disclosure to perform the channel attention on the images obtained from the plurality of the view angles so that when performing the homography transformation onto a certain height, channels which have degrees of importance lower than corresponding threshold values for the certain height are excluded.

In accordance with one aspect of the present disclosure, there is provided a method for training a homography attention module to perform multi-view object detection, including steps of: (a) in response to acquiring a 1-st training image to an n-th training image corresponding to images or video frames obtained concurrently from each of a 1-st camera to an n-th camera that captures a target space at different angles from each other, a learning device performing or supporting another device to perform a process of inputting each of the 1-st training image to the n-th training image to a convolution module and instructing the convolution module to perform convolution operation on each of the 1-st training image to the n-th training image to thereby generate a 1-st feature map to an n-th feature map; (b) the learning device performing or supporting another device to perform a process of inputting an i-th feature map to a homography attention module, wherein the i-th feature map represents each of the 1-st feature map to the n-th feature map when i varies from 1 to n, and instructing the homography attention module to perform processes of (i) (i-1) applying channel attention to the i-th feature map by using each of a 1-st channel attention weight to a d-th channel attention weight corresponding to each of a 1-st height plane to a d-th height plane that divides the target space into different heights, to thereby generate a 1-st channel attention map to a d-th channel attention map, each of which predicts each of channel attention scores that represents each degree of importance, corresponding to each of channels of the i-th feature map, for each of different homography transformations for the different heights, and (i-2) selecting top k channel attention scores for each of the 1-st channel attention map to the d-th channel attention map and then element-wise multiplying each of the top k channel attention scores with channels of the i-th feature map corresponding to each of the top k channel attention scores to thereby generate a 1-st channel refined feature map to a d-th channel refined feature map, each of which has k channels, (ii) (ii-1) applying spatial attention to each of the 1-st channel refined feature map to the d-th channel refined feature map by using each of a 1-st spatial attention weight to a d-th spatial attention weight corresponding to each of the 1-st height plane to the d-th height plane, to thereby generate a 1-st spatial attention map to a d-th spatial attention map, each of which indicates spatial features, included in the i-th feature map, whose degrees of importance for their respective homography transformations for their respective heights are greater than their corresponding threshold values, and (ii-2) element-wise multiplying each of the 1-st spatial attention map to the d-th spatial attention map with each of the 1-st channel refined feature map to the d-th channel refined feature map to thereby generate a 1-st spatial refined feature map to a d-th spatial refined feature map, and (iii) applying homography transformations to each of the 1-st spatial refined feature map to the d-th spatial refined feature map corresponding to the i-th feature map so as to project each of the 1-st spatial refined feature map to the d-th spatial refined feature map corresponding to the i-th feature map onto each of the 1-st height plane to the d-th height plane and thus generate a 1-st projected feature map to a d-th projected feature map corresponding to the i-th feature map; (c) the learning device performing or supporting another device to perform a process of inputting the 1-st projected feature map to the d-th projected feature map corresponding to the i-th feature map to a BEV heatmap generator and instructing the BEV heatmap generator to perform a process of combining the 1-st projected feature map to the d-th projected feature map corresponding to the i-th feature map onto a BEV (Bird's Eye View) plane corresponding to the target space to thereby generate a BEV occupancy heatmap on which objects located in the target space detected by the 1-st camera to the n-th camera are indicated; and (d) the learning device performing or supporting another device to perform a process of generating a loss by referring to the BEV occupancy heatmap and its corresponding GT (Ground Truth) BEV occupancy heatmap, to thereby train at least one of the BEV heatmap generator, the homography attention module and the convolution module by using the loss.

In the above, at the step of (b), the learning device performs or supports another device to perform a process of allowing the homography attention module to instruct a channel gate module included in the homography attention module to (i) apply the channel attention to the i-th feature map by using max pooling operation, average pooling operation and neural operation, wherein, as the channel attention, the channel gate module (i-1) performs the max pooling operation along spatial dimension on each of the channels of the i-th feature map to generate a (1_1)-st pooled feature map and performs the average pooling operation along the spatial dimension on each of the channels of the i-th feature map to generate a (1_2)-nd pooled feature map, and (i-2) inputs the (1_1)-st pooled feature map and the (1_2)-nd pooled feature map to a shared multi-layer perceptron (MLP), applies the neural operation to the (1_1)-st pooled feature map and the (1_2)-nd pooled feature map and thus generates the 1-st channel attention map to the d-th channel attention map, each predicting each of the channel attention scores, by using each of the 1-st channel attention weight to the d-th channel attention weight and (ii) perform softmax operation on the channel attention scores of each channel of the i-th feature map to normalize the channel attention scores to values between 0 and 1, select the top k channel attention scores for each of the 1-st channel attention map to the d-th channel attention map and then element-wise multiply each of the top k channel attention scores with the channels of the i-th feature map corresponding to each of the top k channel attention scores, thus to generate the 1-st channel refined feature map to the d-th channel refined feature map.

In the above, at the step of (b), the learning device performs or supports another device to perform a process of allowing the homography attention module to instruct a spatial gate module included in the homography attention module to (i) apply the spatial attention to the 1-st channel refined feature map to the d-th channel refined feature map by using max pooling operation, average pooling operation, concatenation operation and convolution operation, wherein, as the spatial attention, the spatial gate module (i-1) performs the max pooling operation along channel dimension on each pixel of each of the 1-st channel refined feature map to the d-th channel refined feature map to generate a (2_1)-st pooled feature map for each of the 1-st channel refined feature map to the d-th channel refined feature map and performs the average pooling operation along the channel dimension on each pixel of each of the 1-st channel refined feature map to the d-th channel refined feature map to generate a (2_2)-nd pooled feature map for each of the 1-st channel refined feature map to the d-th channel refined feature map, and (i-2) performs the concatenation operation on the (2_1)-st pooled feature map and the (2_2)-nd pooled feature map to generate an intermediary feature map for each of the 1-st channel refined feature map to the d-th channel refined feature map and then performs the convolution operation on the intermediary feature map to thereby generate the 1-st spatial attention map to the d-th spatial attention map by using each of the 1-st spatial attention weight to the d-th spatial attention weight corresponding to each of the 1-st height plane to the d-th height plane, and (ii) element-wise multiply each of the 1-st spatial attention map to the d-th spatial attention map with each of the 1-st channel refined feature map to the d-th channel refined feature map to thereby generate the 1-st spatial refined feature map to the d-th spatial refined feature map.

In the above, at the step of (b), the learning device performs or supports another device to perform a process of allowing the homography attention module to instruct a homography transformation module included in the homography attention module to homographically transform each of the 1-st spatial refined feature map to the d-th spatial refined feature map corresponding to the i-th feature map onto each of the 1-st height plane to the d-th height plane by applying a predetermined homography transformation matrix corresponding to the i-th feature map to each pixel on the 1-st spatial refined feature map to the d-th spatial refined feature map corresponding to the i-th feature map, to thereby generate the 1-st projected feature map to the d-th projected feature map corresponding to the i-th feature map.

In the above, at the step of (c), the learning device performs or supports another device to perform a process of allowing the BEV heatmap generator to (i) concatenate the 1-st projected feature map to the d-th projected feature map corresponding to the i-th feature map to thereby generate a 1-st aggregated feature map to an n-th aggregated feature map corresponding to the 1-st training image to the n-th training image, and (ii) concatenate the 1-st aggregated feature map to the n-th aggregated feature map to generate an aggregated intermediary feature map and then apply convolution operation to the aggregated intermediary feature map to thereby generate the BEV occupancy heatmap that indicates BEV locations of each of objects included in the 1-st training image to the n-th training image.

In the above, at the step of (d), the learning device performs or supports another device to perform a process of generating the loss in a form of MSE (Mean Squared Error) loss or focal loss by referring to the BEV occupancy heatmap and its corresponding GT BEV occupancy heatmap, and a process of training at least one of the BEV heatmap generator, the homography attention module and the convolution module through back-propagation using the loss.

In accordance with another aspect of the present disclosure, there is provided a method for testing a homography attention module to perform multi-view object detection, including steps of: (a) on condition that a learning device has performed or supported another device to perform processes of (I) in response to acquiring a 1-st training image to an n-th training image corresponding to images or video frames obtained concurrently from each of a 1-st camera to an n-th camera that captures a target space for training at different angles from each other, inputting each of the 1-st training image to the n-th training image to a convolution module and instructing the convolution module to perform convolution operation on each of the 1-st training image to the n-th training image to thereby generate a 1-st feature map for training to an n-th feature map for training, (II) inputting an i-th feature map for training to a homography attention module, wherein the i-th feature map for training represents each of the 1-st feature map for training to the n-th feature map for training when i varies from 1 to n, and instructing the homography attention module to perform processes of (i) (i-1) applying channel attention to the i-th feature map for training by using each of a 1-st channel attention weight to a d-th channel attention weight corresponding to each of a 1-st height plane to a d-th height plane that divides the target space for training into different heights, to thereby generate a 1-st channel attention map for training to a d-th channel attention map for training, each of which predicts each of channel attention scores for training that represents each degree of importance, corresponding to each of channels of the i-th feature map for training, for each of different homography transformations for the different heights, and (i-2) selecting top k channel attention scores for training for each of the 1-st channel attention map for training to the d-th channel attention map for training and then element-wise multiplying each of the top k channel attention scores for training with channels of the i-th feature map for training corresponding to each of the top k channel attention scores for training to thereby generate a 1-st channel refined feature map for training to a d-th channel refined feature map for training, each of which has k channels, (ii) (ii-1) applying spatial attention to each of the 1-st channel refined feature map for training to the d-th channel refined feature map for training by using each of a 1-st spatial attention weight to a d-th spatial attention weight corresponding to each of the 1-st height plane to the d-th height plane, to thereby generate a 1-st spatial attention map for training to a d-th spatial attention map for training, each of which indicates spatial features, included in the i-th feature map for training, whose degrees of importance for their respective homography transformations for their respective heights are greater than their corresponding threshold values, and (ii-2) element-wise multiplying each of the 1-st spatial attention map for training to the d-th spatial attention map for training with each of the 1-st channel refined feature map for training to the d-th channel refined feature map for training to thereby generate a 1-st spatial refined feature map for training to a d-th spatial refined feature map for training, and (iii) applying homography transformations to each of the 1-st spatial refined feature map for training to the d-th spatial refined feature map for training corresponding to the i-th feature map for training so as to project each of the 1-st spatial refined feature map for training to the d-th spatial refined feature map for training corresponding to the i-th feature map for training onto each of the 1-st height plane to the d-th height plane and thus generate a 1-st projected feature map for training to a d-th projected feature map for training corresponding to the i-th feature map for training, (III) inputting the 1-st projected feature map for training to the d-th projected feature map for training corresponding to the i-th feature map for training to a BEV heatmap generator and instructing the BEV heatmap generator to perform a process of combining the 1-st projected feature map for training to the d-th projected feature map for training corresponding to the i-th feature map for training onto a BEV (Bird's Eye View) plane corresponding to the target space for training to thereby generate a BEV occupancy heatmap for training on which objects for training located in the target space for training detected by the 1-st camera to the n-th camera are indicated, and (IV) generating a loss by referring to the BEV occupancy heatmap for training and its corresponding GT (Ground Truth) BEV occupancy heatmap, to thereby train at least one of the BEV heatmap generator, the homography attention module and the convolution module by using the loss, a test device, in response to acquiring a 1-st test image to an n-th test image corresponding to images or video frames obtained concurrently from each of the 1-st camera to the n-th camera that captures a target space for testing at different angles from each other, performing or supporting another device to perform a process of inputting each of the 1-st test image to the n-th test image to the convolution module and instructing the convolution module to perform the convolution operation on each of the 1-st test image to the n-th test image to thereby generate a 1-st feature map for testing to an n-th feature map for testing; (b) the test device performing or supporting another device to perform a process of inputting an i-th feature map for testing to the homography attention module, wherein the i-th feature map for testing represents each of the 1-st feature map for testing to the n-th feature map for testing when i varies from to n, and instructing the homography attention module to perform processes of (i) (i-1) applying the channel attention to the i-th feature map for testing by using each of the 1-st channel attention weight to the d-th channel attention weight corresponding to each of the 1-st height plane to the d-th height plane that divides the target space for testing into the different heights, to thereby generate a 1-st channel attention map for testing to a d-th channel attention map for testing, each of which predicts each of channel attention scores for testing that represents each degree of importance, corresponding to each of channels of the i-th feature map for testing, for each of different homography transformations for the different heights, and (i-2) selecting top k channel attention scores for testing for each of the 1-st channel attention map for testing to the d-th channel attention map for testing and then element-wise multiplying each of the top k channel attention scores for testing with channels of the i-th feature map for testing corresponding to each of the top k channel attention scores for testing to thereby generate a 1-st channel refined feature map for testing to a d-th channel refined feature map for testing, each of which has k channels, (ii) (ii-1) applying the spatial attention to each of the 1-st channel refined feature map for testing to the d-th channel refined feature map for testing by using each of the 1-st spatial attention weight to the d-th spatial attention weight corresponding to each of the 1-st height plane to the d-th height plane, to thereby generate a 1-st spatial attention map for testing to a d-th spatial attention map for testing, each of which indicates spatial features, included in the i-th feature map for testing, whose degrees of importance for their respective homography transformations for their respective heights are greater than their corresponding threshold values, and (ii-2) element-wise multiplying each of the 1-st spatial attention map for testing to the d-th spatial attention map for testing with each of the 1-st channel refined feature map for testing to the d-th channel refined feature map for testing to thereby generate a 1-st spatial refined feature map for testing to a d-th spatial refined feature map for testing, and (iii) applying the homography transformations to each of the 1-st spatial refined feature map for testing to the d-th spatial refined feature map for testing corresponding to the i-th feature map for testing so as to project each of the 1-st spatial refined feature map for testing to the d-th spatial refined feature map for testing corresponding to the i-th feature map for testing onto each of the 1-st height plane to the d-th height plane and thus generate a 1-st projected feature map for testing to a d-th projected feature map for testing corresponding to the i-th feature map for testing; and (c) the test device performing or supporting another device to perform a process of inputting the 1-st projected feature map for testing to the d-th projected feature map for testing corresponding to the i-th feature map for testing to the BEV heatmap generator and instructing the BEV heatmap generator to perform a process of combining the 1-st projected feature map for testing to the d-th projected feature map for testing corresponding to the i-th feature map for testing onto the BEV (Bird's Eye View) plane corresponding to the target space for testing to thereby generate a BEV occupancy heatmap for testing on which objects for testing located in the target space for testing detected by the 1-st camera to the n-th camera are indicated.

In the above, at the step of (b), the test device performs or supports another device to perform a process of allowing the homography attention module to instruct a channel gate module included in the homography attention module to (i) apply the channel attention to the i-th feature map for testing by using max pooling operation, average pooling operation and neural operation, wherein, as the channel attention, the channel gate module (i-1) performs the max pooling operation along spatial dimension on each of the channels of the i-th feature map for testing to generate a (1_1)-st pooled feature map for testing and performs the average pooling operation along the spatial dimension on each of the channels of the i-th feature map for testing to generate a (1_2)-nd pooled feature map for testing, and (i-2) inputs the (1_1)-st pooled feature map for testing and the (1_2)-nd pooled feature map for testing to a shared multi-layer perceptron (MLP), applies the neural operation to the (1_1)-st pooled feature map for testing and the (1_2)-nd pooled feature map for testing and thus generates the 1-st channel attention map for testing to the d-th channel attention map for testing, each predicting each of the channel attention scores for testing, by using each of the 1-st channel attention weight to the d-th channel attention weight and (ii) perform softmax operation on the channel attention scores for testing of each channel of the i-th feature map for testing to normalize the channel attention scores for testing to values between 0 and 1, select the top k channel attention scores for testing for each of the 1-st channel attention map for testing to the d-th channel attention map for testing and then element-wise multiply each of the top k channel attention scores for testing with the channels of the i-th feature map for testing corresponding to each of the top k channel attention scores for testing, thus to generate the 1-st channel refined feature map for testing to the d-th channel refined feature map for testing.

In the above, at the step of (b), the test device performs or supports another device to perform a process of allowing the homography attention module to instruct a spatial gate module included in the homography attention module to (i) apply the spatial attention to the 1-st channel refined feature map for testing to the d-th channel refined feature map for testing by using max pooling operation, average pooling operation, concatenation operation and convolution operation, wherein, as the spatial attention, the spatial gate module (i-1) performs the max pooling operation along channel dimension on each pixel of each of the 1-st channel refined feature map for testing to the d-th channel refined feature map for testing to generate a (2_1)-st pooled feature map for testing for each of the 1-st channel refined feature map for testing to the d-th channel refined feature map for testing and performs the average pooling operation along the channel dimension on each pixel of each of the 1-st channel refined feature map for testing to the d-th channel refined feature map for testing to generate a (2_2)-nd pooled feature map for testing for each of the 1-st channel refined feature map for testing to the d-th channel refined feature map for testing, and (i-2) performs the concatenation operation on the (2_1)-st pooled feature map for testing and the (2_2)-nd pooled feature map for testing to generate an intermediary feature map for testing for each of the 1-st channel refined feature map for testing to the d-th channel refined feature map for testing and then performs the convolution operation on the intermediary feature map for testing to thereby generate the 1-st spatial attention map for testing to the d-th spatial attention map for testing by using each of the 1-st spatial attention weight to the d-th spatial attention weight corresponding to each of the 1-st height plane to the d-th height plane, and (ii) element-wise multiply each of the 1-st spatial attention map for testing to the d-th spatial attention map for testing with each of the 1-st channel refined feature map for testing to the d-th channel refined feature map for testing to thereby generate the 1-st spatial refined feature map for testing to the d-th spatial refined feature map for testing.

In the above, at the step of (b), the test device performs or supports another device to perform a process of allowing the homography attention module to instruct a homography transformation module included in the homography attention module to homographically transform each of the 1-st spatial refined feature map for testing to the d-th spatial refined feature map for testing corresponding to the i-th feature map for testing onto each of the 1-st height plane to the d-th height plane by applying a predetermined homography transformation matrix corresponding to the i-th feature map for testing to each pixel on the 1-st spatial refined feature map for testing to the d-th spatial refined feature map for testing corresponding to the i-th feature map for testing, to thereby generate the 1-st projected feature map for testing to the d-th projected feature map for testing corresponding to the i-th feature map for testing.

In the above, at the step of (c), the test device performs or supports another device to perform a process of allowing the BEV heatmap generator to (i) concatenate the 1-st projected feature map for testing to the d-th projected feature map for testing corresponding to the i-th feature map for testing to thereby generate a 1-st aggregated feature map for testing to an n-th aggregated feature map for testing corresponding to the 1-st test image to the n-th test image, and (ii) concatenate the 1-st aggregated feature map for testing to the n-th aggregated feature map for testing to generate an aggregated intermediary feature map for testing and then apply convolution operation to the aggregated intermediary feature map for testing to thereby generate the BEV occupancy heatmap for testing that indicates BEV locations of each of objects for testing included in the 1-st test image to the n-th test image.

In accordance with still another aspect of the present disclosure, there is provides a learning device for training a homography attention module to perform multi-view object detection, including: at least one memory that stores instructions; and at least one processor configured to execute the instructions to perform or support another device to perform: (I) in response to acquiring a 1-st training image to an n-th training image corresponding to images or video frames obtained concurrently from each of a 1-st camera to an n-th camera that captures a target space at different angles from each other, a a process of inputting each of the 1-st training image to the n-th training image to a convolution module and instructing the convolution module to perform convolution operation on each of the 1-st training image to the n-th training image to thereby generate a 1-st feature map to an n-th feature map, (II) a process of inputting an i-th feature map to a homography attention module, wherein the i-th feature map represents each of the 1-st feature map to the n-th feature map when i varies from 1 to n, and instructing the homography attention module to perform processes of (i) (i-1) applying channel attention to the i-th feature map by using each of a 1-st channel attention weight to a d-th channel attention weight corresponding to each of a 1-st height plane to a d-th height plane that divides the target space into different heights, to thereby generate a 1-st channel attention map to a d-th channel attention map, each of which predicts each of channel attention scores that represents each degree of importance, corresponding to each of channels of the i-th feature map, for each of different homography transformations for the different heights, and (i-2) selecting top k channel attention scores for each of the 1-st channel attention map to the d-th channel attention map and then element-wise multiplying each of the top k channel attention scores with channels of the i-th feature map corresponding to each of the top k channel attention scores to thereby generate a 1-st channel refined feature map to a d-th channel refined feature map, each of which has k channels, (ii) (ii-1) applying spatial attention to each of the 1-st channel refined feature map to the d-th channel refined feature map by using each of a 1-st spatial attention weight to a d-th spatial attention weight corresponding to each of the 1-st height plane to the d-th height plane, to thereby generate a 1-st spatial attention map to a d-th spatial attention map, each of which indicates spatial features, included in the i-th feature map, whose degrees of importance for their respective homography transformations for their respective heights are greater than their corresponding threshold values, and (ii-2) element-wise multiplying each of the 1-st spatial attention map to the d-th spatial attention map with each of the 1-st channel refined feature map to the d-th channel refined feature map to thereby generate a 1-st spatial refined feature map to a d-th spatial refined feature map, and (iii) applying homography transformations to each of the 1-st spatial refined feature map to the d-th spatial refined feature map corresponding to the i-th feature map so as to project each of the 1-st spatial refined feature map to the d-th spatial refined feature map corresponding to the i-th feature map onto each of the 1-st height plane to the d-th height plane and thus generate a 1-st projected feature map to a d-th projected feature map corresponding to the i-th feature map, (III) a process of inputting the 1-st projected feature map to the d-th projected feature map corresponding to the i-th feature map to a BEV heatmap generator and instructing the BEV heatmap generator to perform a process of combining the 1-st projected feature map to the d-th projected feature map corresponding to the i-th feature map onto a BEV (Bird's Eye View) plane corresponding to the target space to thereby generate a BEV occupancy heatmap on which objects located in the target space detected by the 1-st camera to the n-th camera are indicated, and (IV) a process of generating a loss by referring to the BEV occupancy heatmap and its corresponding GT (Ground Truth) BEV occupancy heatmap, to thereby train at least one of the BEV heatmap generator, the homography attention module and the convolution module by using the loss.

In the above, at the process of (II), the processor performs or supports another device to perform a process of allowing the homography attention module to instruct a channel gate module included in the homography attention module to (i) apply the channel attention to the i-th feature map by using max pooling operation, average pooling operation and neural operation, wherein, as the channel attention, the channel gate module (i-1) performs the max pooling operation along spatial dimension on each of the channels of the i-th feature map to generate a (1_1)-st pooled feature map and performs the average pooling operation along the spatial dimension on each of the channels of the i-th feature map to generate a (1_2)-nd pooled feature map, and (i-2) inputs the (1_1)-st pooled feature map and the (1_2)-nd pooled feature map to a shared multi-layer perceptron (MLP), applies the neural operation to the (1_1)-st pooled feature map and the (1_2)-nd pooled feature map and thus generates the 1-st channel attention map to the d-th channel attention map, each predicting each of the channel attention scores, by using each of the 1-st channel attention weight to the d-th channel attention weight and (ii) perform softmax operation on the channel attention scores of each channel of the i-th feature map to normalize the channel attention scores to values between 0 and 1, select the top k channel attention scores for each of the 1-st channel attention map to the d-th channel attention map and then element-wise multiply each of the top k channel attention scores with the channels of the i-th feature map corresponding to each of the top k channel attention scores, thus to generate the 1-st channel refined feature map to the d-th channel refined feature map.

In the above, at the process of (II), the processor performs or supports another device to perform a process of allowing the homography attention module to instruct a spatial gate module included in the homography attention module to (i) apply the spatial attention to the 1-st channel refined feature map to the d-th channel refined feature map by using max pooling operation, average pooling operation, concatenation operation and convolution operation, wherein, as the spatial attention, the spatial gate module (i-1) performs the max pooling operation along channel dimension on each pixel of each of the 1-st channel refined feature map to the d-th channel refined feature map to generate a (2_1)-st pooled feature map for each of the 1-st channel refined feature map to the d-th channel refined feature map and performs the average pooling operation along the channel dimension on each pixel of each of the 1-st channel refined feature map to the d-th channel refined feature map to generate a (2_2)-nd pooled feature map for each of the 1-st channel refined feature map to the d-th channel refined feature map, and (i-2) performs the concatenation operation on the (2 1)-st pooled feature map and the (2_2)-nd pooled feature map to generate an intermediary feature map for each of the 1-st channel refined feature map to the d-th channel refined feature map and then performs the convolution operation on the intermediary feature map to thereby generate the 1-st spatial attention map to the d-th spatial attention map by using each of the 1-st spatial attention weight to the d-th spatial attention weight corresponding to each of the 1-st height plane to the d-th height plane, and (ii) element-wise multiply each of the 1-st spatial attention map to the d-th spatial attention map with each of the 1-st channel refined feature map to the d-th channel refined feature map to thereby generate the 1-st spatial refined feature map to the d-th spatial refined feature map.

In the above, at the process of (II), the processor performs or supports another device to perform a process of allowing the homography attention module to instruct a homography transformation module included in the homography attention module to homographically transform each of the 1-st spatial refined feature map to the d-th spatial refined feature map corresponding to the i-th feature map onto each of the 1-st height plane to the d-th height plane by applying a predetermined homography transformation matrix corresponding to the i-th feature map to each pixel on the 1-st spatial refined feature map to the d-th spatial refined feature map corresponding to the i-th feature map, to thereby generate the 1-st projected feature map to the d-th projected feature map corresponding to the i-th feature map.

In the above, at the process of (III), the processor performs or supports another device to perform a process of allowing the BEV heatmap generator to (i) concatenate the 1-st projected feature map to the d-th projected feature map corresponding to the i-th feature map to thereby generate a 1-st aggregated feature map to an n-th aggregated feature map corresponding to the 1-st training image to the n-th training image, and (ii) concatenate the 1-st aggregated feature map to the n-th aggregated feature map to generate an aggregated intermediary feature map and then apply convolution operation to the aggregated intermediary feature map to thereby generate the BEV occupancy heatmap that indicates BEV locations of each of objects included in the 1-st training image to the n-th training image.

In the above, wherein, at the process of (IV), the processor performs or supports another device to perform a process of generating the loss in a form of MSE (Mean Squared Error) loss or focal loss by referring to the BEV occupancy heatmap and its corresponding GT BEV occupancy heatmap, and a process of training at least one of the BEV heatmap generator, the homography attention module and the convolution module through back-propagation using the loss.

In accordance with still yet another aspect of the present disclosure, there is provided a test device for testing a homography attention module to perform multi-view object detection, including: at least one memory that stores instructions; and at least one processor configured to execute the instructions to perform or support another device to perform: (I) on condition that a learning device has performed or supported another device to perform processes of (1) in response to acquiring a 1-st training image to an n-th training image corresponding to images or video frames obtained concurrently from each of a 1-st camera to an n-th camera that captures a target space for training at different angles from each other, inputting each of the 1-st training image to the n-th training image to a convolution module and instructing the convolution module to perform convolution operation on each of the 1-st training image to the n-th training image to thereby generate a 1-st feature map for training to an n-th feature map for training, (2) inputting an i-th feature map for training to a homography attention module, wherein the i-th feature map for training represents each of the 1-st feature map for training to the n-th feature map for training when i varies from 1 to n, and instructing the homography attention module to perform processes of (i) (i-1) applying channel attention to the i-th feature map for training by using each of a 1-st channel attention weight to a d-th channel attention weight corresponding to each of a 1-st height plane to a d-th height plane that divides the target space for training into different heights, to thereby generate a 1-st channel attention map for training to a d-th channel attention map for training, each of which predicts each of channel attention scores for training that represents each degree of importance, corresponding to each of channels of the i-th feature map for training, for each of different homography transformations for the different heights, and (i-2) selecting top k channel attention scores for training for each of the 1-st channel attention map for training to the d-th channel attention map for training and then element-wise multiplying each of the top k channel attention scores for training with channels of the i-th feature map for training corresponding to each of the top k channel attention scores for training to thereby generate a 1-st channel refined feature map for training to a d-th channel refined feature map for training, each of which has k channels, (ii) (ii-1) applying spatial attention to each of the 1-st channel refined feature map for training to the d-th channel refined feature map for training by using each of a 1-st spatial attention weight to a d-th spatial attention weight corresponding to each of the 1-st height plane to the d-th height plane, to thereby generate a 1-st spatial attention map for training to a d-th spatial attention map for training, each of which indicates spatial features, included in the i-th feature map for training, whose degrees of importance for their respective homography transformations for their respective heights are greater than their corresponding threshold values, and (ii-2) element-wise multiplying each of the 1-st spatial attention map for training to the d-th spatial attention map for training with each of the 1-st channel refined feature map for training to the d-th channel refined feature map for training to thereby generate a 1-st spatial refined feature map for training to a d-th spatial refined feature map for training, and (iii) applying homography transformations to each of the 1-st spatial refined feature map for training to the d-th spatial refined feature map for training corresponding to the i-th feature map for training so as to project each of the 1-st spatial refined feature map for training to the d-th spatial refined feature map for training corresponding to the i-th feature map for training onto each of the 1-st height plane to the d-th height plane and thus generate a 1-st projected feature map for training to a d-th projected feature map for training corresponding to the i-th feature map for training, (3) inputting the 1-st projected feature map for training to the d-th projected feature map for training corresponding to the i-th feature map for training to a BEV heatmap generator and instructing the BEV heatmap generator to perform a process of combining the 1-st projected feature map for training to the d-th projected feature map for training corresponding to the i-th feature map for training onto a BEV (Bird's Eye View) plane corresponding to the target space for training to thereby generate a BEV occupancy heatmap for training on which objects for training located in the target space for training detected by the 1-st camera to the n-th camera are indicated, and (4) generating a loss by referring to the BEV occupancy heatmap for training and its corresponding GT (Ground Truth) BEV occupancy heatmap, to thereby train at least one of the BEV heatmap generator, the homography attention module and the convolution module by using the loss, in response to acquiring a 1-st test image to an n-th test image corresponding to images or video frames obtained concurrently from each of the 1-st camera to the n-th camera that captures a target space for testing at different angles from each other, a process of inputting each of the 1-st test image to the n-th test image to the convolution module and instructing the convolution module to perform the convolution operation on each of the 1-st test image to the n-th test image to thereby generate a 1-st feature map for testing to an n-th feature map for testing, (II) a process of inputting an i-th feature map for testing to the homography attention module, wherein the i-th feature map for testing represents each of the 1-st feature map for testing to the n-th feature map for testing when i varies from 1 to n, and instructing the homography attention module to perform processes of (i) (i-1) applying the channel attention to the i-th feature map for testing by using each of the 1-st channel attention weight to the d-th channel attention weight corresponding to each of the 1-st height plane to the d-th height plane that divides the target space for testing into the different heights, to thereby generate a 1-st channel attention map for testing to a d-th channel attention map for testing, each of which predicts each of channel attention scores for testing that represents each degree of importance, corresponding to each of channels of the i-th feature map for testing, for each of different homography transformations for the different heights, and (i-2) selecting top k channel attention scores for testing for each of the 1-st channel attention map for testing to the d-th channel attention map for testing and then element-wise multiplying each of the top k channel attention scores for testing with channels of the i-th feature map for testing corresponding to each of the top k channel attention scores for testing to thereby generate a 1-st channel refined feature map for testing to a d-th channel refined feature map for testing, each of which has k channels, (ii) (ii-1) applying the spatial attention to each of the 1-st channel refined feature map for testing to the d-th channel refined feature map for testing by using each of the 1-st spatial attention weight to the d-th spatial attention weight corresponding to each of the 1-st height plane to the d-th height plane, to thereby generate a 1-st spatial attention map for testing to a d-th spatial attention map for testing, each of which indicates spatial features, included in the i-th feature map for testing, whose degrees of importance for their respective homography transformations for their respective heights are greater than their corresponding threshold values, and (ii-2) element-wise multiplying each of the 1-st spatial attention map for testing to the d-th spatial attention map for testing with each of the 1-st channel refined feature map for testing to the d-th channel refined feature map for testing to thereby generate a 1-st spatial refined feature map for testing to a d-th spatial refined feature map for testing, and (iii) applying the homography transformations to each of the 1-st spatial refined feature map for testing to the d-th spatial refined feature map for testing corresponding to the i-th feature map for testing so as to project each of the 1-st spatial refined feature map for testing to the d-th spatial refined feature map for testing corresponding to the i-th feature map for testing onto each of the 1-st height plane to the d-th height plane and thus generate a 1-st projected feature map for testing to a d-th projected feature map for testing corresponding to the i-th feature map for testing, and (III) a process of inputting the 1-st projected feature map for testing to the d-th projected feature map for testing corresponding to the i-th feature map for testing to the BEV heatmap generator and instructing the BEV heatmap generator to perform a process of combining the 1-st projected feature map for testing to the d-th projected feature map for testing corresponding to the i-th feature map for testing onto the BEV (Bird's Eye View) plane corresponding to the target space for testing to thereby generate a BEV occupancy heatmap for testing on which objects for testing located in the target space for testing detected by the 1-st camera to the n-th camera are indicated.

In the above, at the process of (II), the processor performs or supports another device to perform a process of allowing the homography attention module to instruct a channel gate module included in the homography attention module to (i) apply the channel attention to the i-th feature map for testing by using max pooling operation, average pooling operation and neural operation, wherein, as the channel attention, the channel gate module (i-1) performs the max pooling operation along spatial dimension on each of the channels of the i-th feature map for testing to generate a (1_1)-st pooled feature map for testing and performs the average pooling operation along the spatial dimension on each of the channels of the i-th feature map for testing to generate a (1_2)-nd pooled feature map for testing, and (i-2) inputs the (1_1)-st pooled feature map for testing and the (1_2)-nd pooled feature map for testing to a shared multi-layer perceptron (MLP), applies the neural operation to the (1_1)-st pooled feature map for testing and the (1_2)-nd pooled feature map for testing and thus generates the 1-st channel attention map for testing to the d-th channel attention map for testing, each predicting each of the channel attention scores for testing, by using each of the 1-st channel attention weight to the d-th channel attention weight and (ii) perform softmax operation on the channel attention scores for testing of each channel of the i-th feature map for testing to normalize the channel attention scores for testing to values between 0 and 1, select the top k channel attention scores for testing for each of the 1-st channel attention map for testing to the d-th channel attention map for testing and then element-wise multiply each of the top k channel attention scores for testing with the channels of the i-th feature map for testing corresponding to each of the top k channel attention scores for testing, thus to generate the 1-st channel refined feature map for testing to the d-th channel refined feature map for testing.

In the above, wherein, at the process of (II), the processor performs or supports another device to perform a process of allowing the homography attention module to instruct a spatial gate module included in the homography attention module to (i) apply the spatial attention to the 1-st channel refined feature map for testing to the d-th channel refined feature map for testing by using max pooling operation, average pooling operation, concatenation operation and convolution operation, wherein, as the spatial attention, the spatial gate module (i-1) performs the max pooling operation along channel dimension on each pixel of each of the 1-st channel refined feature map for testing to the d-th channel refined feature map for testing to generate a (2_1)-st pooled feature map for testing for each of the 1-st channel refined feature map for testing to the d-th channel refined feature map for testing and performs the average pooling operation along the channel dimension on each pixel of each of the 1-st channel refined feature map for testing to the d-th channel refined feature map for testing to generate a (2_2)-nd pooled feature map for testing for each of the 1-st channel refined feature map for testing to the d-th channel refined feature map for testing, and (i-2) performs the concatenation operation on the (2_1)-st pooled feature map for testing and the (2_2)-nd pooled feature map for testing to generate an intermediary feature map for testing for each of the 1-st channel refined feature map for testing to the d-th channel refined feature map for testing and then performs the convolution operation on the intermediary feature map for testing to thereby generate the 1-st spatial attention map for testing to the d-th spatial attention map for testing by using each of the 1-st spatial attention weight to the d-th spatial attention weight corresponding to each of the 1-st height plane to the d-th height plane, and (ii) element-wise multiply each of the 1-st spatial attention map for testing to the d-th spatial attention map for testing with each of the 1-st channel refined feature map for testing to the d-th channel refined feature map for testing to thereby generate the 1-st spatial refined feature map for testing to the d-th spatial refined feature map for testing.

In the above, at the process of (II), the processor performs or supports another device to perform a process of allowing the homography attention module to instruct a homography transformation module included in the homography attention module to homographically transform each of the 1-st spatial refined feature map for testing to the d-th spatial refined feature map for testing corresponding to the i-th feature map for testing onto each of the 1-st height plane to the d-th height plane by applying a predetermined homography transformation matrix corresponding to the i-th feature map for testing to each pixel on the 1-st spatial refined feature map for testing to the d-th spatial refined feature map for testing corresponding to the i-th feature map for testing, to thereby generate the 1-st projected feature map for testing to the d-th projected feature map for testing corresponding to the i-th feature map for testing.

In the above, at the process of (III), the processor performs or supports another device to perform a process of allowing the BEV heatmap generator to (i) concatenate the 1-st projected feature map for testing to the d-th projected feature map for testing corresponding to the i-th feature map for testing to thereby generate a 1-st aggregated feature map for testing to an n-th aggregated feature map for testing corresponding to the 1-st test image to the n-th test image, and (ii) concatenate the 1-st aggregated feature map for testing to the n-th aggregated feature map for testing to generate an aggregated intermediary feature map for testing and then apply convolution operation to the aggregated intermediary feature map for testing to thereby generate the BEV occupancy heatmap for testing that indicates BEV locations of each of objects for testing included in the 1-st test image to the n-th test image.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings. The accompanying drawings used to explain example embodiments of the present disclosure are only part of example embodiments of the present disclosure and other drawings can be obtained based on the drawings by those skilled in the art of the present disclosure without inventive work.

FIG. 10 is a drawing schematically illustrating comparisons made between the performance of the multi-view object detection when only conventional technologies are used and when the homography attention module is applied to the convention technologies in accordance with one example embodiment of the present disclosure.

FIG. 11A and FIG. 11B are drawings schematically illustrating relationships between the performance of the multi-view object detection and the number of homography transformations carried out or the number of channels selected in accordance with one example embodiment of the present disclosure.

FIG. 12 is a drawing schematically illustrating comparisons made between the performance of the multi-view object detection when only the conventional technologies are implemented and when each of the channel gate module, the spatial gate module and the homography attention module is respectively applied to the conventional technologies in accordance with one example embodiment of the present disclosure.

DETAILED DESCRIPTION OF THE PREFERRED EMBODIMENTS

Figure 1:
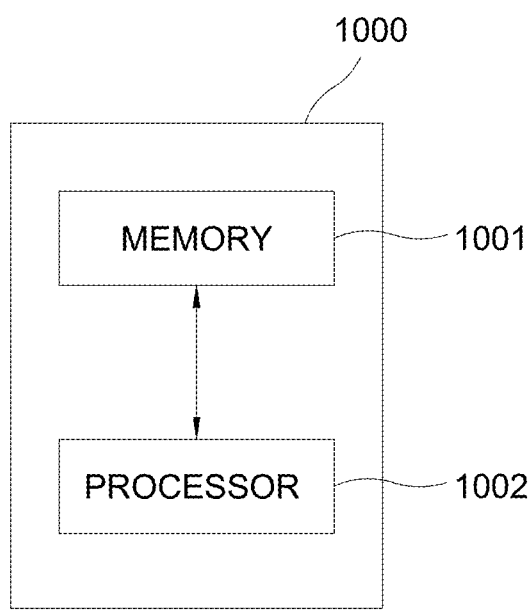
FIG. 1 is a drawing schematically illustrating a learning device for training a homography attention module to perform multi-view object detection in accordance with one example embodiment of the present disclosure.

The following detailed description of the present disclosure refers to the accompanying drawings, which show by way of illustration a specific embodiment in which the present disclosure may be practiced, in order to clarify the objects, technical solutions and advantages of the present disclosure. These embodiments are described in sufficient detail to enable those skilled in the art to practice the present disclosure.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

The headings and abstract of the present disclosure provided herein are for convenience only and do not limit or interpret the scope or meaning of the embodiments.

As used in this specification and the appended claims, the singular forms "a," "an," and "the" may include plural referents unless the content and context clearly dictates otherwise.

For reference, the phrase "for training" or "training" is used for terms related to the learning process, and the phrase "for testing" or "testing" is used for terms related to the testing process, to avoid possible confusion. However, for convenience of explanation, the phrase "for training" is omitted during the explanation on the learning process, and instead the phrase "for training" and the phrase "for testing" are used during the explanation on the testing process to differentiate between the learning process and the testing process.

To allow those skilled in the art to carry out the present disclosure easily, the example embodiments of the present disclosure will be explained by referring to attached diagrams in detail as shown below.

FIG. 1 is a drawing schematically illustrating a learning device 1000 for training a homography attention module to perform multi-view object detection in accordance with one example embodiment of the present disclosure.

By referring to FIG. 1, the learning device 1000 may include a memory 1001 for storing instructions to train the homography attention module to perform the multi-view object detection, and a processor 1002 for training the homography attention module to perform the multi-view object detection according to the instructions in the memory 1001.

Specifically, the learning device 1000 may achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

However, the case in which the computing device includes an integrated processor, integrating a medium, a processor and a memory, for implementing the present disclosure is not excluded.

Meanwhile, the learning device 1000 may train the homography attention module to perform the multi-view object detection such as pedestrian detection, but the present disclosure is not limited thereto.

A process of training the homography attention module to perform the multi-view object detection by using the learning device 1000 configured as explained above is described by referring to FIG. 2 to FIG. 8.

Figure 2:
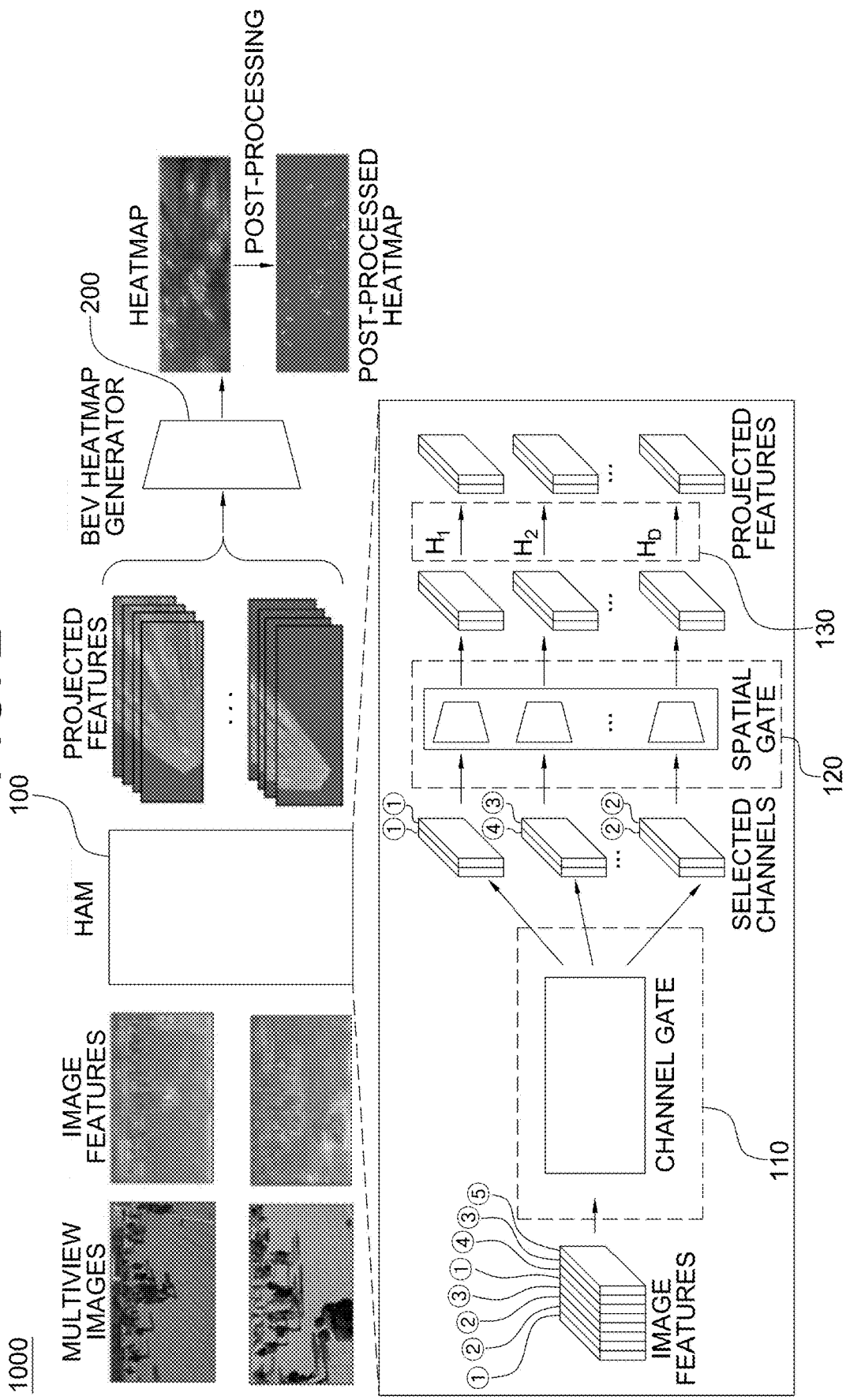
FIG. 2 is a drawing schematically illustrating a method for performing the multi-view object detection by using the homography attention module in accordance with one example embodiment of the present disclosure.

First, FIG. 2 is a drawing schematically illustrating a method for performing the multi-view object detection by using the homography attention module 100 in accordance with one example embodiment of the present disclosure.

By referring to FIG. 2, in response to acquiring a 1-st training image to an n-th training image corresponding to images or video frames obtained concurrently from each of a 1-st camera to an n-th camera that captures a target space at different angles from each other, the learning device 1000 may perform or support another device to perform a process of inputting each of the 1-st training image to the n-th training image to a convolution module (not shown) and instructing the convolution module to perform convolution operation on each of the 1-st training image to the n-th training image to thereby generate a 1-st feature mapto an n-th feature map. Herein, the 1-st feature map to the n-th feature map are shown may correspond to image features shown in FIG. 2.

Next, the learning device 1000 may perform or support another device to perform a process of inputting an i-th feature map to the homography attention module 100, wherein the i-th feature map represents each of the 1-st feature map to the n-th feature map when i varies from 1 to n, and instructing the homography attention module 100 to perform processes of (i) (i-1) applying channel attention to the i-th feature map by using each of a 1-st channel attention weight to a d-th channel attention weight corresponding to each of a 1-st height plane to a d-th height plane that divides the target space into different heights, to thereby generate a 1-st channel attention map to a d-th channel attention map, each of which predicts each of channel attention scores that represents each degree of importance, corresponding to each of channels of the i-th feature map, for each of different homography transformations for the different heights, and (i-2) selecting top k channel attention scores for each of the 1-st channel attention map to the d-th channel attention map and then element-wise multiplying each of the top k channel attention scores with channels of the i-th feature map corresponding to each of the top k channel attention scores to thereby generate a 1-st channel refined feature map to a d-th channel refined feature map, each of which has k channels.

Herein, the i-th feature map represents each of the 1-st feature map to the n-th feature map when i varies from 1 to n.

In other words, when the channel attention is applied to every i-th feature map to eventually generate its corresponding 1-st channel refined feature map to d-th channel refined feature map, it implies that each of the 1-st feature map to the n-th feature map has its corresponding 1-st channel refined feature map to d-th channel refined feature map produced by the homography attention module 100.

Figure 3:
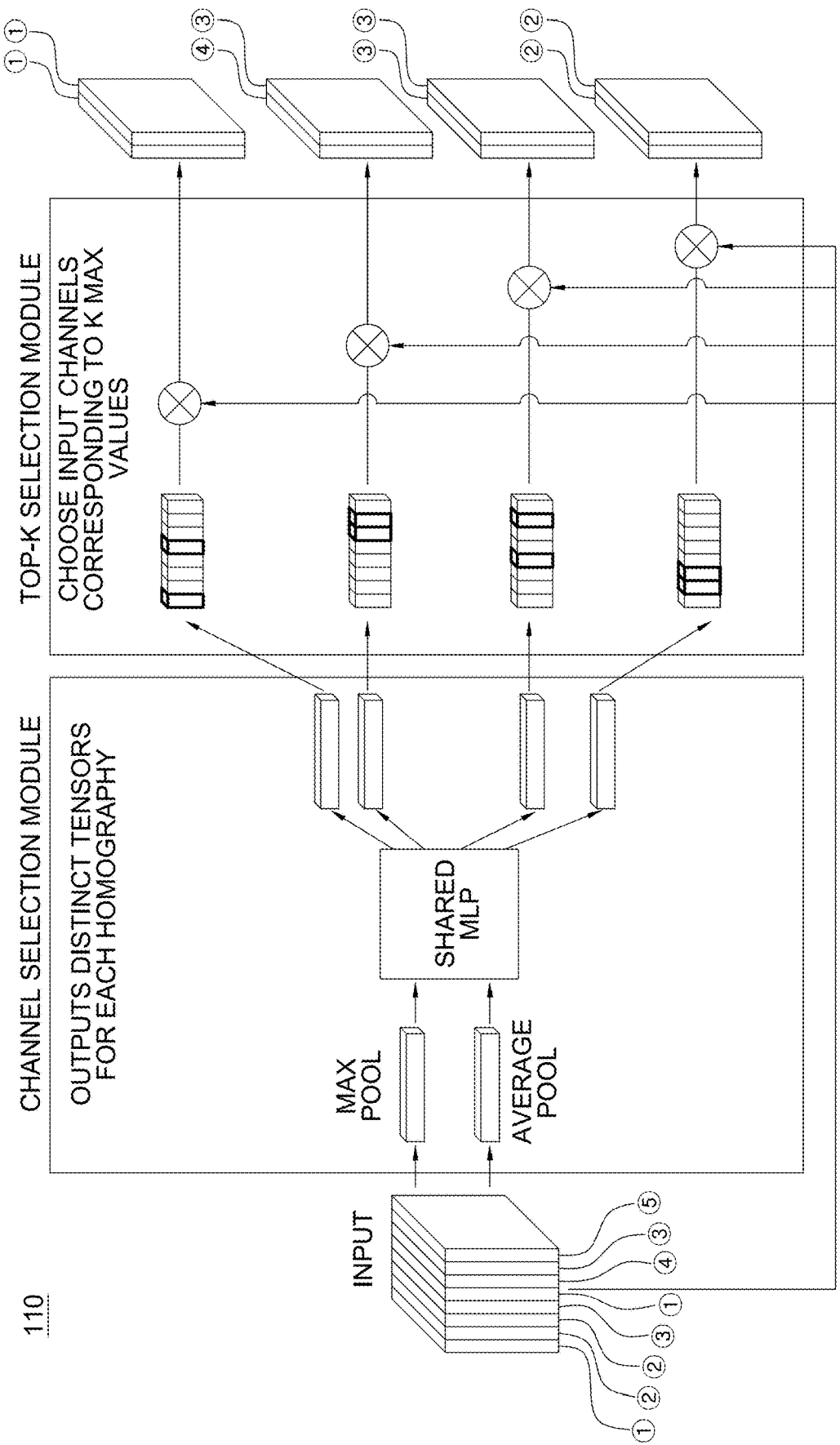
FIG. 3 is a drawing schematically illustrating a channel gate module performing channel attention in accordance with one example embodiment of the present disclosure.

Herein, the learning device 1000 may perform the channel attention using a channel gate module 110 configured as schematically illustrated in FIG. 3. For convenience of explanation, FIG. 3 is demonstrating that the target space is divided into four height planes.

In detail, the learning device 1000 may perform or support another device to perform a process of allowing the homography attention module 100 to instruct the channel gate module 110 included in the homography attention module 100 to apply the channel attention to the i-th feature map by using max pooling operation, average pooling operation and neural operation, wherein, as the channel attention, the channel gate module 110 (i) performs the max pooling operation along spatial dimension on each of the channels of the i-th feature map to generate a (1_1)-st pooled feature map and performs the average pooling operation along the spatial dimension on each of the channels of the i-th feature map to generate a (1_2)-nd pooled feature map, and (ii) inputs the (1_1)-st pooled feature map and the (1_2)-nd pooled feature map to a shared multi-layer perceptron (MLP), applies the neural operation to the (1_1)-st pooled feature map and the (1_2)-nd pooled feature map and thus generates the 1-st channel attention map to the d-th channel attention map, each predicting each of the channel attention scores, by using each of the 1-st channel attention weight to the d-th channel attention weight. Herein, the channel attention scores represent the degree of importance each channel of the i-th feature map has for each of the different homography transformations corresponding to each of the 1-st height plane to the d-th height plane.

Following, the learning device 1000 may perform or support another device to perform a process of allowing the homography attention module 100 to instruct the channel gate module 110 included in the homography attention module 100 to perform softmax operation on the channel attention scores of each channel of the i-th feature map to normalize the channel attention scores to values between 0 and 1, select the top k channel attention scores for each of the 1-st channel attention map to the d-th channel attention map and then element-wise multiply each of the top k channel attention scores with the channels of the i-th feature map corresponding to each of the top k channel attention scores, thus to generate the 1-st channel refined feature map to the d-th channel refined feature map.

That is, the channel gate module 110 according to the present disclosure may generate the channel attention scores with a purpose of selecting channels important for each of the homography transformations onto the 1-st height plane to the d-th height plane, under the assumption that important channels are different for each different homography transformation onto each different height.

Figure 4:
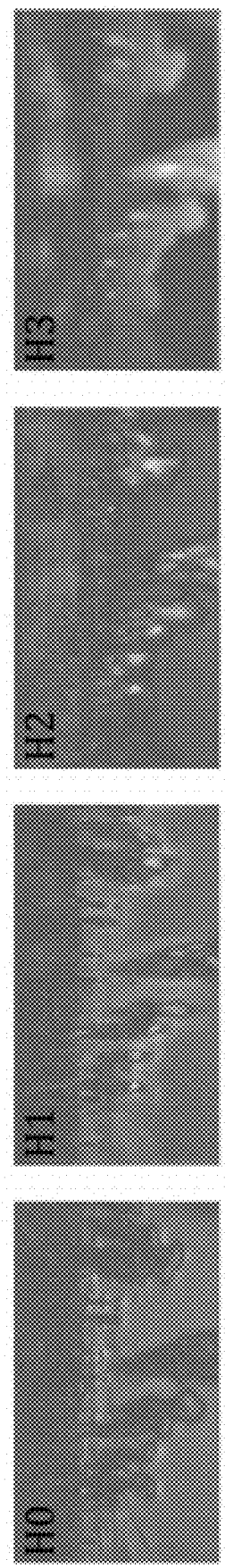
FIG. 4 is a drawing schematically illustrating a state in which channels having features important for each homography transformation onto each height plane are extracted by the channel gate module in accordance with one example embodiment of the present disclosure.

As an evidence, FIG. 4 is schematically illustrating a state in which channels having features important for each homography transformation onto each height plane are extracted by the channel gate module 110 in accordance with one example embodiment of the present disclosure.

Herein, throughout the present disclosure, features extracted from feature maps or images are determined as "important" for a certain homography transformation onto a certain height when these features have degrees of importance higher than corresponding threshold values of the certain height.

By referring to FIG. 4, it is observed that for each homography transformation (H0, H1, H2 and H3), the channel gate module 110 has selected the channels that have the features important for each respective homography transformation. Herein, in order to compare different outputs generated by the channel gate module 110 for each different height plane, i.e., the 1-st height plane to the d-th height plane, to which each different homography transformation is to be performed, FIG. 4 is showing examples of different channel attention maps that are produced by the channel gate module 110. For the convenience of explanation, four different channel maps generated for four different height planes are shown in FIG. 4 as an example.

In a given state that multiple human objects are present in a target space to be captured, FIG. 4 is denoting a ground plane or ideally a height plane close to the ground as H0, and height planes other than the ground plane as H1, H2 and H3, according to their distances from the ground. On each of the outputs listed in FIG. 4, regions with higher weights are highlighted in brighter shades while regions with lower weights are highlighted in darker shades. Correspondingly, it is observed that higher weights are respectively assigned to the human objects' feet (H0), lower bodies (H1), upper bodies (H2) and heads (H3) according to the height of the height planes for which the channels are selected. Hence, based on the observation that regions assigned with higher weights differ for different height planes and that each height of each height plane aligns with each height of each body part given with higher weights for each height plane, it is deduced that the channels that are containing the features important for each homography transformation are different for each height plane and the channel gate module 110 is able to extract them. That being so, instead of involving all channels to carry out subsequent processes required to complete the multi-view object detection, having the channel gate module 110 to extract and use each specific channels suitable for each specific height plane reduces the computational load required for executing the subsequent processes, wherein each selected set of the specific channels includes channels having information for parts of objects from a particular range of height that corresponds to the specific height of the specific height plane.

Figure 5:
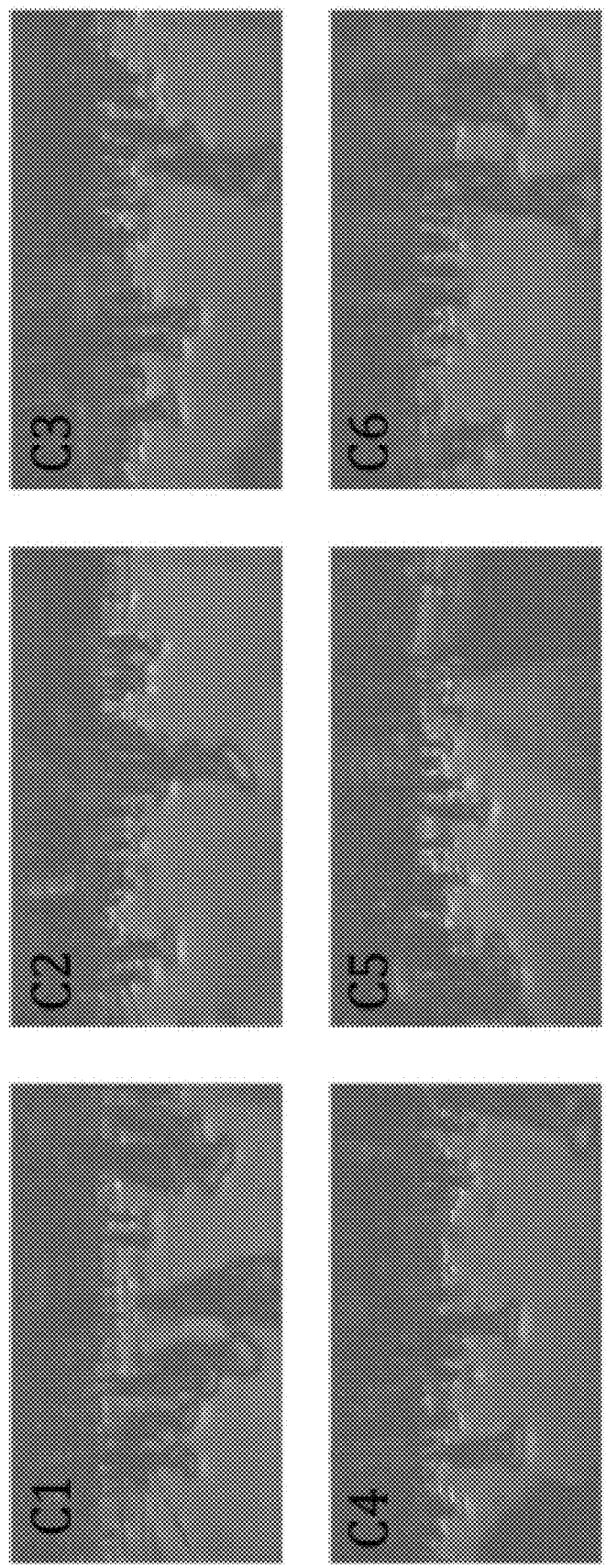
FIG. 5 is a drawing schematically illustrating a state in which, for multi-view images representing each different view angle of a plurality of cameras, the channel gate attention module 110 extracts channels that have features important for a particular homography transformation onto a particular height plane in accordance with one example embodiment of the present disclosure.

Meanwhile, FIG. 5 is schematically illustrating a state in which, for multi-view images representing each different view angle of a plurality of cameras, the channel gate attention module 110 extracts channels that have features important for a particular homography transformation onto a particular height plane in accordance with one example embodiment of the present disclosure. Herein, in order to compare different outputs generated by the channel gate module 110 from the multi-view images representing each different view angle of the plurality of cameras for the particular height plane, FIG. 5 is showing examples of different channel attention maps that are produced by the channel gate module 110.

In a given situation where there are six cameras (C1, C2, C3, C4, C5 and C6) to capture the target space including multiple human objects, FIG. 5 shows that for all six views provided by the six cameras, all of the outputs for the ground plane (H0) produced by the channel gate module 110 are highlighting the feet of the human objects and their surrounding areas in common. In turn, this result implies that for a same height plane, the channel gate module 110 focuses on specific same features across all the multi-view images representing each different view angle of the plurality of cameras.

Figure 6:
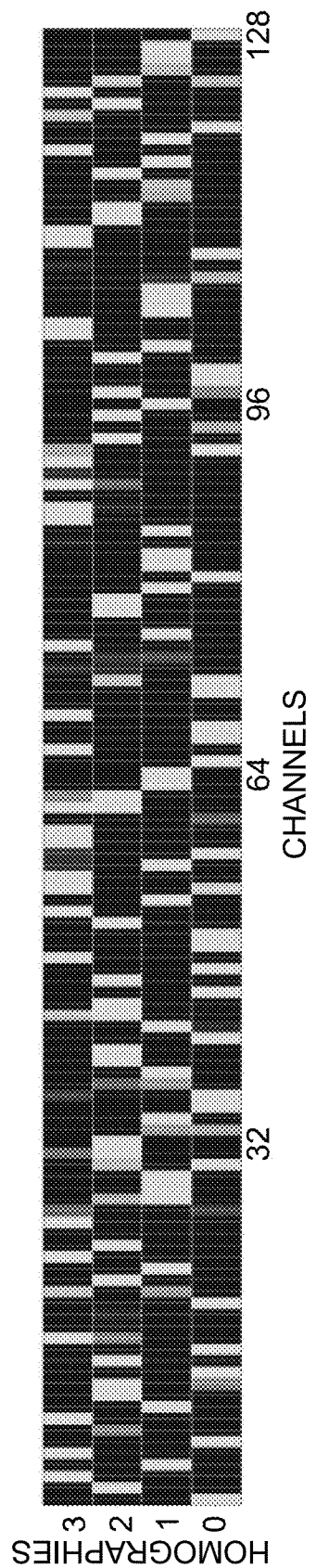
FIG. 6 is a drawing schematically illustrating locations of the channels having the features important for each homography transformation onto each height plane among all channels in accordance with one example embodiment of the present disclosure.

In addition, FIG. 6 is schematically illustrating locations of the channels having the features important for each homography transformation onto each height plane among all channels in accordance with one example embodiment of the present disclosure. According to FIG. 6, it is observed that the channels determined to have the features important for each homography transformation onto each height plane are different for different height planes. Specifically, FIG. 6 is a resultant heatmap generated by counting the number of times each channel is selected for each homography transformation and then dividing the counted number of times by the total number of image pairs in a data set. By referring to FIG. 6, although the number of times each channel is selected by the channel gate module 110 for each height plane may vary for different channels, channels that are selected for a majority of the data set for each homography transformation are unchanged. Also, according to FIG. 6, channels that are frequently selected (highlighted in brighter shades) show almost no overlap across different homography transformations, and this implies that each homography transformation corresponding to each height plane involves channels that are different from each other. Meanwhile, it is also observed from FIG. 6 that there are some channels which are selected across all the height planes or not selected at all for any of the height planes.

In conclusion, by referring to the results of FIG. 4 to FIG. 6, the channel gate module 110 in accordance with the present disclosure is able to produce the channel attention scores to be used for determining which of the channels included in the multi-view images are to be selected for each homography transformation. By doing so, the channel gate module 110 may contribute to clearly differentiating which regions of the multi-view images should be given with higher weights for containing the features that are important to each homography transformation, and at the same time, saving the computational load required for the multi-view object detection by allowing each homography transformation to only use the channels suitable for each respective height plane.

By referring to FIG. 2 again, once the channel attention is performed, the learning device 100 may perform or support another device to perform a process of instructing the homography attention module 100 to perform processes of (i) applying spatial attention to each of the 1-st channel refined feature map to the d-th channel refined feature map by using each of a 1-st spatial attention weight to a d-th spatial attention weight corresponding to each of the 1-st height plane to the d-th height plane, to thereby generate a 1-st spatial attention map to a d-th spatial attention map, each of which indicates spatial features, included in the i-th feature map, whose degrees of importance for their respective homography transformations for their respective heights are greater than their corresponding threshold values, and (ii) element-wise multiplying each of the 1-st spatial attention map to the d-th spatial attention map with each of the 1-st channel refined feature map to the d-th channel refined feature map to thereby generate a 1-st spatial refined feature map to a d-th spatial refined feature map.

Figure 7:
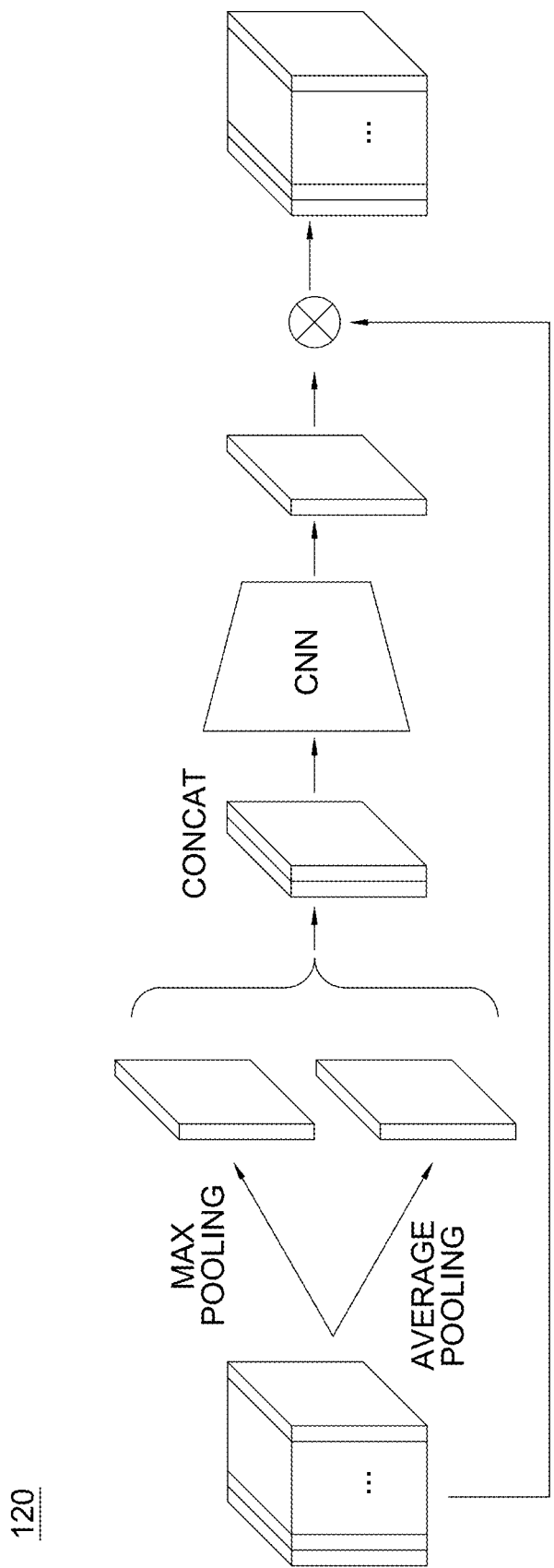
FIG. 7 is a drawing schematically illustrating a spatial attention module performing spatial attention in accordance with one example embodiment of the present disclosure.

Herein, the learning device 1000 may perform the spatial attention using a spatial gate module 120 configured as schematically illustrated in FIG. 7.

In detail, the learning device 1000 may perform or support another device to perform a process of allowing the homography attention module 100 to instruct the spatial gate module 120 included in the homography attention module 100 to apply the spatial attention to the 1-st channel refined feature map to the d-th channel refined feature map by using max pooling operation, average pooling operation, concatenation operation and convolution operation, wherein, as the spatial attention, the spatial gate module 120 (i) performs the max pooling operation along channel dimension on each pixel of each of the 1-st channel refined feature map to the d-th channel refined feature map to generate a (2_1)-st pooled feature map for each of the 1-st channel refined feature map to the d-th channel refined feature map and performs the average pooling operation along the channel dimension on each pixel of each of the 1-st channel refined feature map to the d-th channel refined feature map to generate a (2_2)-nd pooled feature map for each of the 1-st channel refined feature map to the d-th channel refined feature map, and (ii) performs the concatenation operation on the (2_1)-st pooled feature map and the (2_2)-nd pooled feature map to generate an intermediary feature map for each of the 1-st channel refined feature map to the d-th channel refined feature map and then performs the convolution operation on the intermediary feature map to thereby generate the 1-st spatial attention map to the d-th spatial attention map by using each of the 1-st spatial attention weight to the d-th spatial attention weight corresponding to each of the 1-st height plane to the d-th height plane.

Following, the learning device 1000 may perform or support another device to perform a process of allowing the homography attention module 100 to instruct the spatial gate module 120 included in the homography attention module 100 to element-wise multiply each of the 1-st spatial attention map to the d-th spatial attention map with each of the 1-st channel refined feature map to the d-th channel refined feature map to thereby generate the 1-st spatial refined feature map to the d-th spatial refined feature map.

Figure 8:
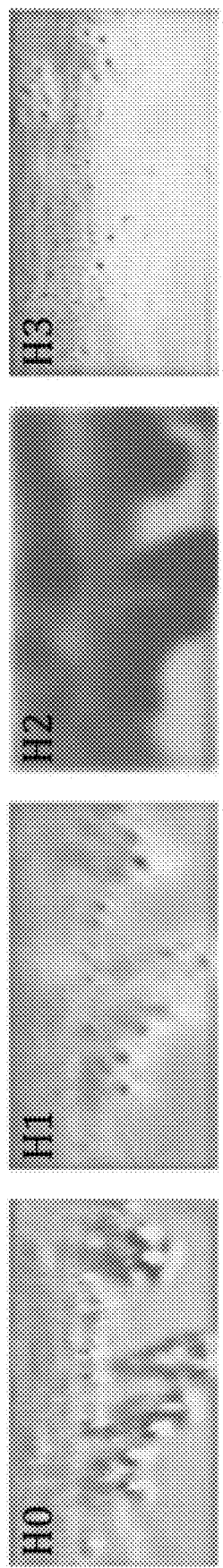
FIG. 8 is a drawing schematically illustrating a state in which features determined to be important by the spatial gate module for each homography transformation are extracted from each spatial dimension of the channels selected by the channel gate module for each height plane in accordance with one example embodiment of the present disclosure.

Herein, FIG. 8 is schematically illustrating a state in which features determined to be important by the spatial gate module 120 for each homography transformation are extracted from each spatial dimension of the channels selected by the channel gate module 110 for each height plane in accordance with one example embodiment of the present disclosure. By referring to FIG. 8, it is observed that each result generated by performing the spatial attention performed on each different homography transformation (H0, H1, H2 and H3) shows distributions that are distinctively different from each other. Through this, it is deducible that pixels on the 1-st channel refined feature map to the d-th channel refined feature map differ in importance for each homography transformation.

Thereafter, by referring to FIG. 2 again, the learning device 1000 may perform or support another device to perform a process of instructing the homography attention module 100 to perform a process of applying the homography transformations to each of the 1-st spatial refined feature map to the d-th spatial refined feature map corresponding to the i-th feature map so as to project each of the 1-st spatial refined feature map to the d-th spatial refined feature map corresponding to the i-th feature map onto each of the 1-st height plane to the d-th height plane and thus generate a 1-st projected feature map to a d-th projected feature map corresponding to the i-th feature map. Herein, the homography transformation is a transformation that establishes a relationship between corresponding points of two planes, and coordinates on one plane can be projected onto coordinates on another plane through the homography transformation.

In detail, the learning device 1000 may perform or support another device to perform a process of allowing the homography attention module 100 to instruct a homography transformation module 130 included in the homography attention module 100 to homographically transform each of the 1-st spatial refined feature map to the d-th spatial refined feature map corresponding to the i-th feature map onto each of the 1-st height plane to the d-th height plane by applying a predetermined homography transformation matrix corresponding to the i-th feature map to each pixel on the 1-st spatial refined feature map to the d-th spatial refined feature map corresponding to the i-th feature map, to thereby generate the 1-st projected feature map to the d-th projected feature map corresponding to the i-th feature map.

Herein, the predetermined homgraphy transformation matrix for generating the 1-st projected feature map to the d-th projected feature map corresponding to the i-th feature map may be determined as follows.

Firstly, given that the 1-st training image to the n-th training image corresponding to the images or the video frames obtained concurrently from each of the 1-st camera to the n-th camera that captures the target space at different angles from each other are denoted as $I^1$ to $I^N$, the 1-st spatial refined feature map to the d-th spatial refined feature map corresponding to the i-th feature map, representing each of the 1-st feature map to the n-th feature map when i varies from 1 to n, may be denoted as $M^1$ to $M^N$. Also, intrinsic parameters and extrinsic parameters of an i-th camera, representing each of the 1-st camera to the n-th camera when i varies from 1 to n, may be referred to as $G^i \in \mathbb{R}^{3\times 3}$ and $E^i = [R^i | t^i] \in \mathbb{R}^{3\times 4}$ respectively, wherein $R^i$ is a 3×3 matrix for rotation in a 3D space and e is a 3×1 vector representing translation. Also, following the conventional technology MVDet, a BEV plane corresponding to a target space described by a BEV occupancy map is quantized into grids and an additional matrix, $F^i \in \mathbb{R}^{3\times 3}$, for mapping world coordinates onto the said grids is defined.

Accordingly, for each pixel on the 1-st spatial refined feature map to the d-th spatial refined feature map, with an image coordinate (υν) and its corresponding position (X, Y, Z) in the 3D space, a following equation may be formulated using a pinhole camera model.

$$\begin{pmatrix} u \\ v \\ 1 \end{pmatrix} = \lambda G^i [R^i | t^i] \begin{pmatrix} X \\ Y \\ Z \\ 1 \end{pmatrix} \quad \text{[Equation 1]}$$

Herein, λ is a scaling factor that accounts for possible mismatches between each of the 1-st spatial refined feature map to the d-th spatial refined feature map and 3D space increments. For the ground plane (Z=0), the above equation may be written as follows.

$$\begin{pmatrix} u \\ v \\ 1 \end{pmatrix} = \begin{bmatrix} \theta^i_{11} & \theta^i_{12} & \theta^i_{13} & \theta^i_{14} \\ \theta^i_{21} & \theta^i_{22} & \theta^i_{23} & \theta^i_{24} \\ \theta^i_{31} & \theta^i_{32} & \theta^i_{33} & \theta^i_{34} \end{bmatrix} \quad \text{[Equation 2]}$$

$$\begin{pmatrix} X \\ Y \\ 0 \\ 1 \end{pmatrix} = \begin{bmatrix} \theta^i_{11} & \theta^i_{12} & \theta^i_{14} \\ \theta^i_{21} & \theta^i_{22} & \theta^i_{24} \\ \theta^i_{31} & \theta^i_{32} & \theta^i_{34} \end{bmatrix} \begin{pmatrix} X \\ Y \\ 1 \end{pmatrix} = \Theta^i \begin{pmatrix} X \\ Y \\ 1 \end{pmatrix}$$

For the equation formulated as above, an inverse of $\Theta^i$ may be applied to both sides of the equation and $F^i$ may be multiplied to obtain a matrix mapping the image coordinate directly onto the said grids. The said matrix, which is also a homography transformation matrix, may be written as follows.

$$H^i = F^i (\Theta^i)^{-1} \quad \text{[Equation 3]}$$

In order to expand this approach to height planes (Z≠0) other than the ground plane, the conventional technology SHOT is adopted and $\Theta^i$ is replaced as follows.

$$\Theta^i = \begin{bmatrix} \theta^i_{11} & \theta^i_{12} & \theta^i_{14} + k\triangle z \theta^i_{13} \\ \theta^i_{21} & \theta^i_{22} & \theta^i_{24} + k\triangle z \theta^i_{23} \\ \theta^i_{31} & \theta^i_{32} & \theta^i_{34} + k\triangle z \theta^i_{33} \end{bmatrix} \quad \text{[Equation 4]}$$

Herein, $\theta^i_{j3} (j \in \{1,2,3\})$ are values omitted from Equation 2, $\triangle z$ is a distance between each of adjacent height planes, and k is any non-negative integer lower than the total number of the homography transformations, thus denoting all possible heights for the homography transformations. With this new $\Theta^i$, the form of the homography transformation matrix as shown in the Equation 3 is retained.

By referring to FIG. 2 again, once the 1-st projected feature map to the d-th project feature map corresponding to the i-th feature map are generated, the learning device 1000 may perform or support another device to perform a process of inputting the 1-st projected feature map to the d-th projected feature map corresponding to the i-th feature map to a BEV heatmap generator 200 and instructing the BEV heatmap generator 200 to perform a process of combining the 1-st projected feature map to the d-th projected feature map corresponding to the i-th feature map onto the BEV (Bird's Eye View) plane corresponding to the target space to thereby generate a BEV occupancy heatmap on which objects located in the target space detected by the 1-st camera to the n-th camera are indicated. Herein, the BEV heatmap generator 200 including at least one convolutional neural network (CNN) layer may generate the BEV occupancy heatmap by performing concatenation and feature detection on the 1-st projected feature map to the d-th projected feature map through a neural operation. The BEV occupancy heatmap generated may be a map representation that indicates with dots where each object presented in the target space is located when the target space is viewed from above, that is, when viewed from the bird's eye view. Also, if trackers are added to the BEV occupancy heatmap as a possible way of post-processing, unique IDs may be allocated to each of the dots, e.g., to track movements of pedestrians during performing multi-view pedestrian detection.

In detail, the learning device 1000 may perform or support another device to perform a process of allowing the BEV heatmap generator 200 to (i) concatenate the 1-st projected feature map to the d-th projected feature map corresponding to the i-th feature map to thereby generate a 1-st aggregated feature map to an n-th aggregated feature map corresponding to the 1-st training image to the n-th training image, and (ii) concatenate the 1-st aggregated feature map to the n-th aggregated feature map to generate an aggregated intermediary feature map and then apply convolution operation to the aggregated intermediary feature map to thereby generate the BEV occupancy heatmap that indicates BEV locations of each of objects included in the 1-st training image to the n-th training image.

Subsequently, the learning device 1000 may perform or support another device to perform a process of generating a loss by referring to the BEV occupancy heatmap and its corresponding GT (Ground Truth) BEV occupancy heatmap, to thereby train at least one of the BEV heatmap generator 200, the homography attention module 100 and the convolution module by using the loss. Herein, the GT BEV occupancy heatmap may include GT information on object positions of each object located in the BEV occupancy heatmap, and accordingly the training may be performed by using errors between the object positions of the BEV occupancy heatmap and the GT BEV occupancy heatmap, but the present disclosure is not limited thereto.

Also, the learning device 1000 may perform or support another device to perform a process of generating the loss in a form of MSE (Mean Squared Error) loss or focal loss by referring to the BEV occupancy heatmap and its corresponding GT BEV occupancy heatmap, and a process of training at least one of the BEV heatmap generator 200, the homography attention module 100 and the convolution module through back-propagation using the loss. Herein, the 1-st channel attention weight to the d-th channel attention weight and the 1-st spatial attention weight to the d-th spatial attention weight of the homography attention module 100 may be updated through the training.

Meanwhile, on condition that the BEV heatmap generator 200, the homography attention module 100 and the convolution module have been trained as stated above, a test device may test the homography attention module 100 in accordance with one example embodiment of the present disclosure as explained below.

Figure 9:
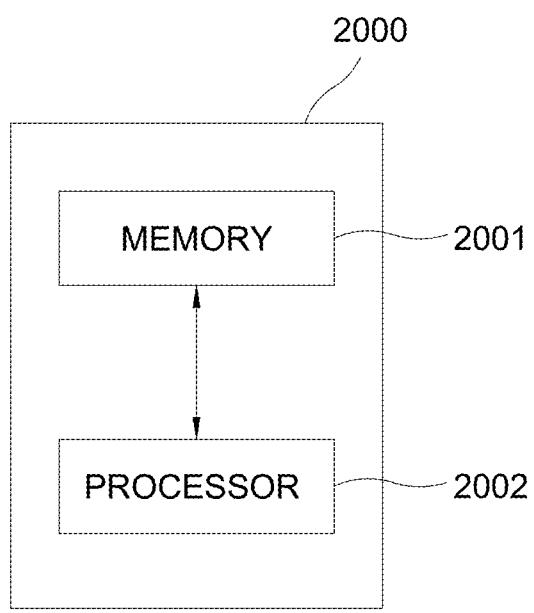
FIG. 9 is a drawing schematically illustrating a test device for testing the homography attention module to perform the multi-view object detection in accordance with one example embodiment of the present disclosure.

First, FIG. 9 is a drawing schematically illustrating the test device 2000 for testing the homography attention module 100 to perform the multi-view object detection in accordance with one example embodiment of the present disclosure.

By referring to FIG. 9, the test device 2000 may include a memory 2001 for storing instructions to test the homography attention module 100 to perform the multi-view object detection, and a processor 2002 for testing the homography attention module 100 to perform the multi-view object detection according to the instructions in the memory 2001.

Specifically, the test device 2000 may achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

However, the case in which the computing device includes an integrated processor, integrating a medium, a processor and a memory, for implementing the present disclosure is not excluded.

Meanwhile, the test device 2000 may test the homography attention module 100 to perform the multi-view object detection such as the pedestrian detection, but the present disclosure is not limited thereto.

A process of testing the homography attention module 100 to perform the multi-view object detection by using the test device 2000 configured as explained above is described as follows. In the following description, detailed explanation of parts that can be easily understood from the description provided by referring to FIG. 2 to FIG. 8 are omitted.

First, on condition that the BEV heatmap generator 200, the homography attention module 100 and the convolution module have been trained as explained above, the test device 2000, in response to acquiring a 1-st test image to an n-th test image corresponding to images or video frames obtained concurrently from each of the 1-st camera to the n-th camera that captures a target space for testing at different angles from each other, may perform or support another device to perform a process of inputting each of the 1-st test image to the n-th test image to the convolution module and instruct the convolution module to perform the convolution operation on each of the 1-st test image to the n-th test image to thereby generate a 1-st feature map for testing to an n-th feature map for testing.

Next, the test device 2000 may perform or support another device to perform a process of inputting an i-th feature map for testing to the homography attention module 100, wherein the i-th feature map for testing represents each of the 1-st feature map for testing to the n-th feature map for testing when i varies from 1 to n, and instructing the homography attention module 100 to perform processes of (i) applying the channel attention to the i-th feature map for testing by using each of the 1-st channel attention weight to the d-th channel attention weight corresponding to each of the 1-st height plane to the d-th height plane that divides the target space for testing into the different heights, to thereby generate a 1-st channel attention map for testing to a d-th channel attention map for testing, each of which predicts each of channel attention scores for testing that represents each degree of importance, corresponding to each of channels of the i-th feature map for testing, for each of different homography transformations for the different heights, and (ii) selecting top k channel attention scores for testing for each of the 1-st channel attention map for testing to the d-th channel attention map for testing and then element-wise multiplying each of the top k channel attention scores for testing with channels of the i-th feature map for testing corresponding to each of the top k channel attention scores for testing to thereby generate a 1-st channel refined feature map for testing to a d-th channel refined feature map for testing, each of which has k channels.

In detail, the test device 2000 may perform or support another device to perform a process of allowing the homography attention module 100 to instruct the channel gate module 110 included in the homography attention module 100 to apply the channel attention to the i-th feature map for testing by using max pooling operation, average pooling operation and neural operation, wherein, as the channel attention, the channel gate module 110 (i) performs the max pooling operation along spatial dimension on each of the channels of the i-th feature map for testing to generate a (1_1)-st pooled feature map for testing and performs the average pooling operation along the spatial dimension on each of the channels of the i-th feature map for testing to generate a (1_2)-nd pooled feature map for testing, and (ii) inputs the (1_1)-st pooled feature map for testing and the (1_2)-nd pooled feature map for testing to the shared multi-layer perceptron (MLP), applies the neural operation to the (1_1)-st pooled feature map for testing and the (1_2)-nd pooled feature map for testing and thus generates the 1-st channel attention map for testing to the d-th channel attention map for testing, each predicting each of the channel attention scores for testing, by using each of the 1-st channel attention weight to the d-th channel attention weight.

Following, the test device 2000 may perform or support another device to perform a process of allowing the homography attention module 100 to instruct the channel gate module 110 included in the homography attention module 100 to perform the softmax operation on the channel attention scores for testing of each channel of the i-th feature map for testing to normalize the channel attention scores for testing to values between 0 and 1, select the top k channel attention scores for testing for each of the 1-st channel attention map for testing to the d-th channel attention map for testing and then element-wise multiply each of the top k channel attention scores for testing with the channels of the i-th feature map for testing corresponding to each of the top k channel attention scores for testing, thus to generate the 1-st channel refined feature map for testing to the d-th channel refined feature map for testing.

Once the channel attention is performed, the test device 2000 may perform or support another device to perform a process of instructing the homography attention module 100 to perform processes of (i) applying the spatial attention to each of the 1-st channel refined feature map for testing to the d-th channel refined feature map for testing by using each of the 1-st spatial attention weight to the d-th spatial attention weight corresponding to each of the 1-st height plane to the d-th height plane, to thereby generate a 1-st spatial attention map for testing to a d-th spatial attention map for testing, each of which indicates spatial features, included in the i-th feature map for testing, whose degrees of importance for their respective homography transformations for their respective heights are greater than their corresponding threshold values, and (ii) element-wise multiplying each of the 1-st spatial attention map for testing to the d-th spatial attention map for testing with each of the 1-st channel refined feature map for testing to the d-th channel refined feature map for testing to thereby generate a 1-st spatial refined feature map for testing to a d-th spatial refined feature map for testing.

In detail, the test device 2000 may perform or support another device to perform a process of a process of allowing the homography attention module 100 to instruct the spatial gate module 120 included in the homography attention module 100 to apply the spatial attention to the 1-st channel refined feature map for testing to the d-th channel refined feature map for testing by using max pooling operation, average pooling operation, concatenation operation and convolution operation, wherein, as the spatial attention, the spatial gate module 120 (i) performs the max pooling operation along channel dimension on each pixel of each of the 1-st channel refined feature map for testing to the d-th channel refined feature map for testing to generate a (2_1)-st pooled feature map for testing for each of the 1-st channel refined feature map for testing to the d-th channel refined feature map for testing and performs the average pooling operation along the channel dimension on each pixel of each of the 1-st channel refined feature map for testing to the d-th channel refined feature map for testing to generate a (2_2)-nd pooled feature map for testing for each of the 1-st channel refined feature map for testing to the d-th channel refined feature map for testing, and (ii) performs the concatenation operation on the (2_1)-st pooled feature map for testing and the (2_2)-nd pooled feature map for testing to generate an intermediary feature map for testing for each of the 1-st channel refined feature map for testing to the d-th channel refined feature map for testing and then performs the convolution operation on the intermediary feature map for testing to thereby generate the 1-st spatial attention map for testing to the d-th spatial attention map for testing by using each of the 1-st spatial attention weight to the d-th spatial attention weight corresponding to each of the 1-st height plane to the d-th height plane.

Following, the test device 2000 may perform or support another device to perform a process of allowing the homography attention module 100 to instruct the spatial gate module 120 included in the homography attention module 100 to element-wise multiply each of the 1-st spatial attention map for testing to the d-th spatial attention map for testing with each of the 1-st channel refined feature map for testing to the d-th channel refined feature map for testing to thereby generate the 1-st spatial refined feature map for testing to the d-th spatial refined feature map for testing.

Afterwards, the test device 2000 may perform or support another device to perform a process of instructing the homography attention module 100 to perform a process of applying the homography transformations to each of the 1-st spatial refined feature map for testing to the d-th spatial refined feature map for testing corresponding to the i-th feature map for testing so as to project each of the 1-st spatial refined feature map for testing to the d-th spatial refined feature map for testing corresponding to the i-th feature map for testing onto each of the 1-st height plane to the d-th height plane and thus generate a 1-st projected feature map for testing to a d-th projected feature map for testing corresponding to the i-th feature map for testing.

In detail, the test device 2000 may perform or support another device to perform a process of allowing the homography attention module 100 to instruct the homography transformation module 130 included in the homography attention module 100 to homographically transform each of the 1-st spatial refined feature map for testing to the d-th spatial refined feature map for testing corresponding to the i-th feature map for testing onto each of the 1-st height plane to the d-th height plane by applying the predetermined homography transformation matrix corresponding to the i-th feature map for testing to each pixel on the 1-st spatial refined feature map for testing to the d-th spatial refined feature map for testing corresponding to the i-th feature map for testing, to thereby generate the 1-st projected feature map for testing to the d-th projected feature map for testing corresponding to the i-th feature map for testing.

Accordingly, once the 1-st projected feature map for testing to the d-th projected feature map for testing corresponding to the i-th feature map for testing are generated, the test device 2000 may perform or support another device to perform a process of inputting the 1-st projected feature map for testing to the d-th projected feature map for testing corresponding to the i-th feature map for testing to the BEV heatmap generator 200 and instructing the BEV heatmap generator 200 to perform a process of combining the 1-st projected feature map for testing to the d-th projected feature map for testing corresponding to the i-th feature map for testing onto the BEV (Bird's Eye View) plane corresponding to the target space for testing to thereby generate a BEV occupancy heatmap for testing on which objects for testing located in the target space for testing detected by the 1-st camera to the n-th camera are indicated.

In detail, the test device 2000 may perform or support another device to perform a process of allowing the BEV heatmap generator 200 to (i) concatenate the 1-st projected feature map for testing to the d-th projected feature map for testing corresponding to the i-th feature map for testing to thereby generate a 1-st aggregated feature map for testing to an n-th aggregated feature map for testing corresponding to the 1-st test image to the n-th test image, and (ii) concatenate the 1-st aggregated feature map for testing to the n-th aggregated feature map for testing to generate an aggregated intermediary feature map for testing and then apply convolution operation to the aggregated intermediary feature map for testing to thereby generate the BEV occupancy heatmap for testing that indicates BEV locations of each of objects for testing included in the 1-st test image to the n-th test image.

Meanwhile, FIG. 10 to FIG. 12 are showing results of testing the performance of the homography attention module 100 in accordance with one example embodiment of the present disclosure. Herein, for the testing of the performance carried out in FIG. 10 to FIG. 12, the homography attention module 100 is inserted to existing multi-view detection frameworks to perform the homography transformations, so that the performance of using the existing multi-view detection frameworks without any alteration and the performance of using the homography attention module 100 in combination with the existing multi-view detection frameworks are compared. In this case, MVDet, MVDeTr and SHOT technologies are used as the existing multi-view detection frameworks, and these technologies are briefly described below.

First, in case of MVDet, multi-view images from multiple view angles are first passed through a generic feature extractor such as ResNet18 with minor modifications to generate feature maps, and then the feature maps are passed through an additional convolutional neural network to detect heads and feet of pedestrians present in the feature maps, with a purpose to aid training of the MVDet network. Next, the feature maps are projected onto the ground plane via homography transformation and then concatenated. Additionally, x-y coordinate maps are concatenated to a stack of transformed feature map to generate an aggregated ground plane feature map, and then the aggregated ground plane feature map is passed through a CNN to generate a bird's-eye-view (BEV) heatmap which is then post-processed via methods such as thresholding and non-maximum suppression (NMS).

As an extended version of MVDet, MVDeTr performs view-coherent data augmentations on the multi-view images by applying transformations, such as rotation, translation, sheer, scale or cropping, to the multi-view images while maintaining view-consistency requirements, i.e., maintaining locations of original objects in the multi-view images and preserving coherencies of feature distributions around the original objects. Further, MVDeTr replaces the CNN (for generating the BEV heatmap) with a shadow transformer with a purpose to handle various distortion patterns occurred during multi-view aggregation. Additionally, MVDeTr replaces the MSE loss used in MVDet with Focal Loss coupled with an offset regression loss.

While both MVDet and MVDeTr project their feature maps onto the ground plane only, SHOT proposes to approximate projections onto 3D world coordinates via a stack of homographies.

In the processes of testing the performance of the homography attention module 100 according to FIG. 10 to FIG. 12, the exiting multi-view detection frameworks are used as is without modifications to their loss or training configuration, and the homography attention module 100 is simply plugged-in to the existing multi-view detection frameworks. In the case of inserting the homography attention module 100 to SHOT, a function of a soft-selection module adopted by SHOT to predict a likelihood map that assigns each pixel on features extracted from the multi-view images to one of the homography transformations is rendered obsolete by the function of the homography attention module 100. This being the case, the soft-selection module is removed when comparing the performance of SHOT plugged-in with the homography attention module 100 with reported performance of SHOT.

Meanwhile, the performance of the homography attention module 100 is tested on datasets such as Wildtrack and MultiviewX, and four metrics, namely, Multiple Object Detection Accuracy (MODA), Multiple Object Detection Precision (MODP), Precision, and Recall, are used for comparing the performance of the existing multi-view detection frameworks with the performance of using the homography attention module 100 in combination with the existing multi-view detection frameworks.

Herein, given that N is defined as the number of ground truth (GT) pedestrians and if true positives (TP), false positives (FP) and false negatives (FN) are known, Precision and Recall are respectively calculated as $$\frac{TP}{FP+TP}$$

and $$\frac{TP}{N}.$$

In addition, MODA is an accuracy metric for object detection tasks and is therefore obtained by calculating $$1 - \frac{FP + FN}{N}.$$

MODP is obtained by calculating $$\frac{\sum 1 - d[d < t]/t}{TP},$$

wherein d is a distance from an object detection location to its corresponding ground truth (GT) object detection location and t is a threshold value for a correct detection. Herein, an original threshold of 20 is maintained as proposed in SHOT. For all tests, input images are resized to a size of 720×1280, and the distance between different height planes, Δz, is set to be 10 on Wildtrack dataset and 0.1 on MultiviewX dataset.

For tests implementing the homography attention module 100 to SHOT, four homography transformations are used and top-32 channels are set to be selected each for the four homography transformations.

Following the test settings as explained above, FIG. 10 is schematically illustrating comparisons made between the performance of the multi-view object detection when only conventional technologies are used and the performance of the multi-view object detection when the homography attention module 100 is applied to the convention technologies.

According to FIG. 10, in the case of using MultiviewX dataset, all metric values showed improvement or similar performance compared to existing results when the homography attention module 100 is applied to MVDet, MVDeTr, and SHOT. In particular, when the homography attention module 100 is used for MVDet, reported values for using MVDet on MultiviewX dataset is improved by 3.0%, 2.2%, 1.8%, and 1.5% for MODA, MODP, Precision, and Recall respectively. For Wildtrack dataset, the use of the homography attention moduel 100 again results in improvements of all four metric values with only the exception of MVDeTr. Even for MVDeTr, there was only a 0.2% decrease in Precision while the use of the homography attention module 100 improves results of MODA, MODP, and Recall by 0.9%, 0.8%, and 1.2% respectively. In short, when compared with the conventional technologies, applying the homography attention module 100 (aka, Booster-Shot) of the present disclosure to the convention technologies contributes to improvements in all metrics except of the Precision of MVDeTr.

Also, taking into account that the shadow transformer is used as a way to improve performance in MVDeTr, the performance of Booster-Shot+Tr, i.e., the performance of using the shadow transformer in combination with the configuration illustrated in FIG. 2 of the present disclosure is also compared with the performance of Booster-Shot, i.e., the performance of using the configuration of the present disclosure as it is. However, by referring to FIG. 10, it is observed that using the shadow transformer does not show significant improvements in metrics as compared to using the convolutional structure of the BEV heatmap generator 200.

Next, FIG. 11A and FIG. 11B are schematically illustrating relationships between the performance of the multi-view object detection and the number of homography transformations carried out or the number of channels selected in accordance with one example embodiment of the present disclosure.

Since the multiple homography transfomrations is used as a quantized version of a 3D projection, using more homography transformations results in a better performance of the multi-view object detection. Since the present disclosure allocates fewer channels to each homography transformation as the number of homography transformations increases, the performance of a model in which the homography attention module 100 is applied to SHOT is tested for using 2, 4, 6, and 8 homography transformations. By referring to FIG. 11A accordingly, it is observed that all four metrics show improvements as the number of homography transformations increases. It is also noticeable from FIG. 11A that while MODP and the Recall showed highest results when 6 homography transformations are used, the Precision showed highest results when 8 homography transformations are used. As for MODA, highest results are observed for either case of using 6 homography transformations or using 8 homography transformations. Seeing that the overall performance becomes similar as the number of homography transformations increases, it is deduced that the improvement resulted from the increase in the number of homography transformations reaches an equilibrium with the decrease in the number of channels transmitted to each homography transformation and thus saturation in terms of the performance is reached.

Meanwhile, the present disclosure uses an approach of determining the number of channels selected per homography transformation based on the number of homography transformations and the number of channels inputted. For example, when 128 channels are included in each input image and four homography transformations are used, 32 channels are selected for each homography transformation. Accordingly, FIG. 11B is comparing the performances of the multi-view object detection according to the number of channels (K) selected for each homography transformation in accordance with one example embodiment of the present disclosure. That is, for example, if K is 64 under a condition that the number of channels inputted is 128 and the number of homography transformations is 4, a total of 256 (64×4) channels are outputted.

By referring to FIG. 11B, using top 16 channels for each homography transformation outperforms the other instances with considerable margins in terms of MODA, MODP and Precision, with the only exception of Recall which had its highest value when top 32 channels are selected. These results, in turn, imply that, rather than using all channels, the approach of the present disclosure to remove irrelevant channels for each homography transformation is more effective in focusing on information relevant to each homography transformation. By experimenting with different combinations of the number of homography transformations and the number of channels selected, it is possible to establish a generalized rule that maximizes the effectiveness of the homography transformation module of the present disclosure.

Next, FIG. 12 is schematically illustrating comparisons made between the performance of the multi-view object detection when only the conventional technologies are implemented and the performance of the multi-view object detection when each of the channel gate module 110, each of the spatial gate module 120 and the homography attention module 100 is respectively applied to the conventional technologies in accordance with one example embodiment of the present disclosure.

By referring to FIG. 12, it is first seen that the performance of MVDet is still improved to some extents when the channel gate module 110 or the spatial gate module 120 is individually applied to MVDet. However, FIG. 12 shows that when the channel gate module 110 and the spatial gate module 120 are used sequentially, in other words when the homography attention module 100 is used, results of MODA and Recall are improved while a similar Precision level to that of using MVDet alone is maintained, leading to an overall performance improvement.

The present disclosure has an effect of performing the channel attention and the spatial attention sequentially on the images that are obtained from the plurality of cameras capturing the target space from various view angles, prior to performing the homographic transformation to multiple height planes, wherein, as the channel attention, the channel attention scores the channels included in each of the images have for each of height planes to be projected are estimated and, as the spatial attention, important features for each height plane are extracted.

The present disclosure has another effect of performing the channel attention on the images obtained from the plurality of the view angles so that when performing the homography transformation onto a certain height, channels which have degrees of importance lower than corresponding threshold values for the certain height, thereby reducing computational load required and improving the performance of the homography transformation.

The present disclosure has still another effect of improving the accuracy of the multi-view aggregation by performing the spatial attention on outputs, generated from performing the channel attention on the images obtained from the plurality of the view angles, to select pixels corresponding to important spatial features for each height plane.

Besides, the embodiments of the present disclosure as explained above can be implemented in a form of executable program command through a variety of computer means recordable to computer readable media. The computer readable media may store solely or in combination, program commands, data files, and data structures. The program commands recorded in the media may be components specially designed for the present disclosure or may be usable for a skilled human in a field of computer software. The computer readable media include, but are not limited to, magnetic media such as hard drives, floppy diskettes, magnetic tapes, memory cards, solid-state drives, USB flash drives, optical media such as CD-ROM and DVD, magneto-optical media such as floptical diskettes and hardware devices such as a read-only memory (ROM), a random access memory (RAM), and a flash memory specially designed to store and carry out program commands. Program commands may include not only a machine language code made by a compiler but also a high level code that can be used by an interpreter etc., which is executed by a computer. The aforementioned hardware device may work as more than a software module to perform the action of the present disclosure and they may do the same in the opposite case. The hardware device may include a processor such as a CPU or a GPU, combined with a memory device such as ROM or RAM to store the program commands, configured to execute the commands stored in the memory, and a communication part which can exchange signals with external devices. In addition, the hardware device may include a keyboard, a mouse, and any other external input device to receive commands prepared by developers.

As seen above, the present disclosure has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for training a homography attention module to perform multi-view object detection, comprising steps of:
  (a) in response to acquiring a 1-st training image to an n-th training image corresponding to images or video frames obtained concurrently from each of a 1-st camera to an n-th camera that captures a target space at different angles from each other, a learning device performing or supporting another device to perform a process of inputting each of the 1-st training image to the n-th training image to a convolution module and instructing the convolution module to perform convolution operation on each of the 1-st training image to the n-th training image to thereby generate a 1-st feature map to an n-th feature map;
  (b) the learning device performing or supporting another device to perform a process of inputting an i-th feature map to a homography attention module, wherein the i-th feature map represents each of the 1-st feature map to the n-th feature map when i varies from 1 to n, and instructing the homography attention module to perform processes of (i) (i-1) applying channel attention to the i-th feature map by using each of a 1-st channel attention weight to a d-th channel attention weight corresponding to each of a 1-st height plane to a d-th height plane that divides the target space into different heights, to thereby generate a 1-st channel attention map to a d-th channel attention map, each of which predicts each of channel attention scores that represents each degree of importance, corresponding to each of channels of the i-th feature map, for each of different homography transformations for the different heights, and (i-2) selecting top k channel attention scores for each of the 1-st channel attention map to the d-th channel attention map and then element-wise multiplying each of the top k channel attention scores with channels of the i-th feature map corresponding to each of the top k channel attention scores to thereby generate a 1-st channel refined feature map to a d-th channel refined feature map, each of which has k channels, (ii) (ii-1) applying spatial attention to each of the 1-st channel refined feature map to the d-th channel refined feature map by using each of a 1-st spatial attention weight to a d-th spatial attention weight corresponding to each of the 1-st height plane to the d-th height plane, to thereby generate a 1-st spatial attention map to a d-th spatial attention map, each of which indicates spatial features, included in the i-th feature map, whose degrees of importance for their respective homography transformations for their respective heights are greater than their corresponding threshold values, and (ii-2) element-wise multiplying each of the 1-st spatial attention map to the d-th spatial attention map with each of the 1-st channel refined feature map to the d-th channel refined feature map to thereby generate a 1-st spatial refined feature map to a d-th spatial refined feature map, and (iii) applying homography transformations to each of the 1-st spatial refined feature map to the d-th spatial refined feature map corresponding to the i-th feature map so as to project each of the 1-st spatial refined feature map to the d-th spatial refined feature map corresponding to the i-th feature map onto each of the 1-st height plane to the d-th height plane and thus generate a 1-st projected feature map to a d-th projected feature map corresponding to the i-th feature map;

(c) the learning device performing or supporting another device to perform a process of inputting the 1-st projected feature map to the d-th projected feature map corresponding to the i-th feature map to a BEV heatmap generator and instructing the BEV heatmap generator to perform a process of combining the 1-st projected feature map to the d-th projected feature map corresponding to the i-th feature map onto a BEV (Bird's Eye View) plane corresponding to the target space to thereby generate a BEV occupancy heatmap on which objects located in the target space detected by the 1-st camera to the n-th camera are indicated; and (d) the learning device performing or supporting another device to perform a process of generating a loss by referring to the BEV occupancy heatmap and its corresponding GT (Ground Truth) BEV occupancy heatmap, to thereby train at least one of the BEV heatmap generator, the homography attention module and the convolution module by using the loss.

2. The method of claim 1, wherein, at the step of (b), the learning device performs or supports another device to perform a process of allowing the homography attention module to instruct a channel gate module included in the homography attention module to (i) apply the channel attention to the i-th feature map by using max pooling operation, average pooling operation and neural operation, wherein, as the channel attention, the channel gate module (i-1) performs the max pooling operation along spatial dimension on each of the channels of the i-th feature map to generate a (1_1)-st pooled feature map and performs the average pooling operation along the spatial dimension on each of the channels of the i-th feature map to generate a (1_2)-nd pooled feature map, and (i-2) inputs the (1_1)-st pooled feature map and the (1_2)-nd pooled feature map to a shared multi-layer perceptron (MLP), applies the neural operation to the (1_1)-st pooled feature map and the (1_2)-nd pooled feature map and thus generates the 1-st channel attention map to the d-th channel attention map, each predicting each of the channel attention scores, by using each of the 1-st channel attention weight to the d-th channel attention weight and (ii) perform softmax operation on the channel attention scores of each channel of the i-th feature map to normalize the channel attention scores to values between 0 and 1, select the top k channel attention scores for each of the 1-st channel attention map to the d-th channel attention map and then element-wise multiply each of the top k channel attention scores with the channels of the i-th feature map corresponding to each of the top k channel attention scores, thus to generate the 1-st channel refined feature map to the d-th channel refined feature map.

3. The method of claim 1, wherein, at the step of (b), the learning device performs or supports another device to perform a process of allowing the homography attention module to instruct a spatial gate module included in the homography attention module to (i) apply the spatial attention to the 1-st channel refined feature map to the d-th channel refined feature map by using max pooling operation, average pooling operation, concatenation operation and convolution operation, wherein, as the spatial attention, the spatial gate module (i-1) performs the max pooling operation along channel dimension on each pixel of each of the 1-st channel refined feature map to the d-th channel refined feature map to generate a (2_1)-st pooled feature map for each of the 1-st channel refined feature map to the d-th channel refined feature map and performs the average pooling operation along the channel dimension on each pixel of each of the 1-st channel refined feature map to the d-th channel refined feature map to generate a (2_2)-nd pooled feature map for each of the 1-st channel refined feature map to the d-th channel refined feature map, and (i-2) performs the concatenation operation on the (2_1)-st pooled feature map and the (2_2)-nd pooled feature map to generate an intermediary feature map for each of the 1-st channel refined feature map to the d-th channel refined feature map and then performs the convolution operation on the intermediary feature map to thereby generate the 1-st spatial attention map to the d-th spatial attention map by using each of the 1-st spatial attention weight to the d-th spatial attention weight corresponding to each of the 1-st height plane to the d-th height plane, and (ii) element-wise multiply each of the 1-st spatial attention map to the d-th spatial attention map with each of the 1-st channel refined feature map to the d-th channel refined feature map to thereby generate the 1-st spatial refined feature map to the d-th spatial refined feature map.

4. The method of claim 1, wherein, at the step of (b), the learning device performs or supports another device to perform a process of allowing the homography attention module to instruct a homography transformation module included in the homography attention module to homographically transform each of the 1-st spatial refined feature map to the d-th spatial refined feature map corresponding to the i-th feature map onto each of the 1-st height plane to the d-th height plane by applying a predetermined homography transformation matrix corresponding to the i-th feature map to each pixel on the 1-st spatial refined feature map to the d-th spatial refined feature map corresponding to the i-th feature map, to thereby generate the 1-st projected feature map to the d-th projected feature map corresponding to the i-th feature map.

5. The method of claim 1, wherein, at the step of (c), the learning device performs or supports another device to perform a process of allowing the BEV heatmap generator to (i) concatenate the 1-st projected feature map to the d-th projected feature map corresponding to the i-th feature map to thereby generate a 1-st aggregated feature map to an n-th aggregated feature map corresponding to the 1-st training image to the n-th training image, and (ii) concatenate the 1-st aggregated feature map to the n-th aggregated feature map to generate an aggregated intermediary feature map and then apply convolution operation to the aggregated intermediary feature map to thereby generate the BEV occupancy heatmap that indicates BEV locations of each of objects included in the 1-st training image to the n-th training image.

6. The method of claim 1, wherein, at the step of (d), the learning device performs or supports another device to perform a process of generating the loss in a form of MSE (Mean Squared Error) loss or focal loss by referring to the BEV occupancy heatmap and its corresponding GT BEV occupancy heatmap, and a process of training at least one of the BEV heatmap generator, the homography attention module and the convolution module through back-propagation using the loss.

7. A method for testing a homography attention module to perform multi-view object detection, comprising steps of:
(a) on condition that a learning device has performed or supported another device to perform processes of (I) in response to acquiring a 1-st training image to an n-th training image corresponding to images or video frames obtained concurrently from each of a 1-st camera to an n-th camera that captures a target space for training at different angles from each other, inputting each of the 1-st training image to the n-th training image to a convolution module and instructing the convolution module to perform convolution operation on each of the 1-st training image to the n-th training image to thereby generate a 1-st feature map for training to an n-th feature map for training, (II) inputting an i-th feature map for training to a homography attention module, wherein the i-th feature map for training represents each of the 1-st feature map for training to the n-th feature map for training when i varies from 1 to n, and instructing the homography attention module to perform processes of (i) (i-1) applying channel attention to the i-th feature map for training by using each of a 1-st channel attention weight to a d-th channel attention weight corresponding to each of a 1-st height plane to a d-th height plane that divides the target space for training into different heights, to thereby generate a 1-st channel attention map for training to a d-th channel attention map for training, each of which predicts each of channel attention scores for training that represents each degree of importance, corresponding to each of channels of the i-th feature map for training, for each of different homography transformations for the different heights, and (i-2) selecting top k channel attention scores for training for each of the 1-st channel attention map for training to the d-th channel attention map for training and then element-wise multiplying each of the top k channel attention scores for training with channels of the i-th feature map for training corresponding to each of the top k channel attention scores for training to thereby generate a 1-st channel refined feature map for training to a d-th channel refined feature map for training, each of which has k channels, (ii) (ii-1) applying spatial attention to each of the 1-st channel refined feature map for training to the d-th channel refined feature map for training by using each of a 1-st spatial attention weight to a d-th spatial attention weight corresponding to each of the 1-st height plane to the d-th height plane, to thereby generate a 1-st spatial attention map for training to a d-th spatial attention map for training, each of which indicates spatial features, included in the i-th feature map for training, whose degrees of importance for their respective homography transformations for their respective heights are greater than their corresponding threshold values, and (ii-2) element-wise multiplying each of the 1-st spatial attention map for training to the d-th spatial attention map for training with each of the 1-st channel refined feature map for training to the d-th channel refined feature map for training to thereby generate a 1-st spatial refined feature map for training to a d-th spatial refined feature map for training, and (iii) applying homography transformations to each of the 1-st spatial refined feature map for training to the d-th spatial refined feature map for training corresponding to the i-th feature map for training so as to project each of the 1-st spatial refined feature map for training to the d-th spatial refined feature map for training corresponding to the i-th feature map for training onto each of the 1-st height plane to the d-th height plane and thus generate a 1-st projected feature map for training to a d-th projected feature map for training corresponding to the i-th feature map for training, (III) inputting the 1-st projected feature map for training to the d-th projected feature map for training corresponding to the i-th feature map for training to a BEV heatmap generator and instructing the BEV heatmap generator to perform a process of combining the 1-st projected feature map for training to the d-th projected feature map for training corresponding to the i-th feature map for training onto a BEV (Bird's Eye View) plane corresponding to the target space for training to thereby generate a BEV occupancy heatmap for training on which objects for training located in the target space for training detected by the 1-st camera to the n-th camera are indicated, and (IV) generating a loss by referring to the BEV occupancy heatmap for training and its corresponding GT (Ground Truth) BEV occupancy heatmap, to thereby train at least one of the BEV heatmap generator, the homography attention module and the convolution module by using the loss, a test device, in response to acquiring a 1-st test image to an n-th test image corresponding to images or video frames obtained concurrently from each of the 1-st camera to the n-th camera that captures a target space for testing at different angles from each other, performing or supporting another device to perform a process of inputting each of the 1-st test image to the n-th test image to the convolution module and instructing the convolution module to perform the convolution operation on each of the 1-st test image to the n-th test image to thereby generate a 1-st feature map for testing to an n-th feature map for testing;
(b) the test device performing or supporting another device to perform a process of inputting an i-th feature map for testing to the homography attention module, wherein the i-th feature map for testing represents each of the 1-st feature map for testing to the n-th feature map for testing when i varies from 1 to n, and instructing the homography attention module to perform processes of (i) (i-1) applying the channel attention to the i-th feature map for testing by using each of the 1-st channel attention weight to the d-th channel attention weight corresponding to each of the 1-st height plane to the d-th height plane that divides the target space for testing into the different heights, to thereby generate a 1-st channel attention map for testing to a d-th channel attention map for testing, each of which predicts each of channel attention scores for testing that represents each degree of importance, corresponding to each of channels of the i-th feature map for testing, for each of different homography transformations for the different heights, and (i-2) selecting top k channel attention scores for testing for each of the 1-st channel attention map for testing to the d-th channel attention map for testing and then element-wise multiplying each of the top k channel attention scores for testing with channels of the i-th feature map for testing corresponding to each of the top k channel attention scores for testing to thereby generate a 1-st channel refined feature map for testing to a d-th channel refined feature map for testing, each of which has k channels, (ii) (ii-1) applying the spatial attention to each of the 1-st channel refined feature map for testing to the d-th channel refined feature map for testing by using each of the 1-st spatial attention weight to the d-th spatial attention weight corresponding to each of the 1-st height plane to the d-th height plane, to thereby generate a 1-st spatial attention map for testing to a d-th spatial attention map for testing, each of which indicates spatial features, included in the i-th feature map for testing, whose degrees of importance for their respective homography transformations for their respective heights are greater than their corresponding threshold values, and (ii-2) element-wise multiplying each of the 1-st spatial attention map for testing to the d-th spatial attention map for testing with each of the 1-st channel refined feature map for testing to the d-th channel refined feature map for testing to thereby generate a 1-st spatial refined feature map for testing to a d-th spatial refined feature map for testing, and (iii) applying the homography transformations to each of the 1-st spatial refined feature map for testing to the d-th spatial refined feature map for testing corresponding to the i-th feature map for testing so as to project each of the 1-st spatial refined feature map for testing to the d-th spatial refined feature map for testing corresponding to the i-th feature map for testing onto each of the 1-st height plane to the d-th height plane and thus generate a 1-st projected feature map for testing to a d-th projected feature map for testing corresponding to the i-th feature map for testing; and (c) the test device performing or supporting another device to perform a process of inputting the 1-st projected feature map for testing to the d-th projected feature map for testing corresponding to the i-th feature map for testing to the BEV heatmap generator and instructing the BEV heatmap generator to perform a process of combining the 1-st projected feature map for testing to the d-th projected feature map for testing corresponding to the i-th feature map for testing onto the BEV (Bird's Eye View) plane corresponding to the target space for testing to thereby generate a BEV occupancy heatmap for testing on which objects for testing located in the target space for testing detected by the 1-st camera to the n-th camera are indicated.

8. The method of claim 7, wherein, at the step of (b), the test device performs or supports another device to perform a process of allowing the homography attention module to instruct a channel gate module included in the homography attention module to (i) apply the channel attention to the i-th feature map for testing by using max pooling operation, average pooling operation and neural operation, wherein, as the channel attention, the channel gate module (i-1) performs the max pooling operation along spatial dimension on each of the channels of the i-th feature map for testing to generate a (1_1)-st pooled feature map for testing and performs the average pooling operation along the spatial dimension on each of the channels of the i-th feature map for testing to generate a (1_2)-nd pooled feature map for testing, and (i-2) inputs the (1_1)-st pooled feature map for testing and the (1_2)-nd pooled feature map for testing to a shared multi-layer perceptron (MLP), applies the neural operation to the (1_1)-st pooled feature map for testing and the (1_2)-nd pooled feature map for testing and thus generates the 1-st channel attention map for testing to the d-th channel attention map for testing, each predicting each of the channel attention scores for testing, by using each of the 1-st channel attention weight to the d-th channel attention weight and (ii) perform softmax operation on the channel attention scores for testing of each channel of the i-th feature map for testing to normalize the channel attention scores for testing to values between 0 and 1, select the top k channel attention scores for testing for each of the 1-st channel attention map for testing to the d-th channel attention map for testing and then element-wise multiply each of the top k channel attention scores for testing with the channels of the i-th feature map for testing corresponding to each of the top k channel attention scores for testing, thus to generate the 1-st channel refined feature map for testing to the d-th channel refined feature map for testing.

9. The method of claim 7, wherein, at the step of (b), the test device performs or supports another device to perform a process of allowing the homography attention module to instruct a spatial gate module included in the homography attention module to (i) apply the spatial attention to the 1-st channel refined feature map for testing to the d-th channel refined feature map for testing by using max pooling operation, average pooling operation, concatenation operation and convolution operation, wherein, as the spatial attention, the spatial gate module (i-1) performs the max pooling operation along channel dimension on each pixel of each of the 1-st channel refined feature map for testing to the d-th channel refined feature map for testing to generate a (2_1)-st pooled feature map for testing for each of the 1-st channel refined feature map for testing to the d-th channel refined feature map for testing and performs the average pooling operation along the channel dimension on each pixel of each of the 1-st channel refined feature map for testing to the d-th channel refined feature map for testing to generate a (2_2)-nd pooled feature map for testing for each of the 1-st channel refined feature map for testing to the d-th channel refined feature map for testing, and (i-2) performs the concatenation operation on the (2_1)-st pooled feature map for testing and the (2_2)-nd pooled feature map for testing to generate an intermediary feature map for testing for each of the 1-st channel refined feature map for testing to the d-th channel refined feature map for testing and then performs the convolution operation on the intermediary feature map for testing to thereby generate the 1-st spatial attention map for testing to the d-th spatial attention map for testing by using each of the 1-st spatial attention weight to the d-th spatial attention weight corresponding to each of the 1-st height plane to the d-th height plane, and (ii) element-wise multiply each of the 1-st spatial attention map for testing to the d-th spatial attention map for testing with each of the 1-st channel refined feature map for testing to the d-th channel refined feature map for testing to thereby generate the 1-st spatial refined feature map for testing to the d-th spatial refined feature map for testing.

10. The method of claim 7, wherein, at the step of (b), the test device performs or supports another device to perform a process of allowing the homography attention module to instruct a homography transformation module included in the homography attention module to homographically transform each of the 1-st spatial refined feature map for testing to the d-th spatial refined feature map for testing corresponding to the i-th feature map for testing onto each of the 1-st height plane to the d-th height plane by applying a predetermined homography transformation matrix corresponding to the i-th feature map for testing to each pixel on the 1-st spatial refined feature map for testing to the d-th spatial refined feature map for testing corresponding to the i-th feature map for testing, to thereby generate the 1-st projected feature map for testing to the d-th projected feature map for testing corresponding to the i-th feature map for testing.

11. The method of claim 7, wherein, at the step of (c), the test device performs or supports another device to perform a process of allowing the BEV heatmap generator to (i) concatenate the 1-st projected feature map for testing to the d-th projected feature map for testing corresponding to the i-th feature map for testing to thereby generate a 1-st aggregated feature map for testing to an n-th aggregated feature map for testing corresponding to the 1-st test image to the n-th test image, and (ii) concatenate the 1-st aggregated feature map for testing to the n-th aggregated feature map for testing to generate an aggregated intermediary feature map for testing and then apply convolution operation to the aggregated intermediary feature map for testing to thereby generate the BEV occupancy heatmap for testing that indicates BEV locations of each of objects for testing included in the 1-st test image to the n-th test image.

12. A learning device for training a homography attention module to perform multi-view object detection, comprising:
at least one memory that stores instructions; and
at least one processor configured to execute the instructions to perform or support another device to perform: (I) in response to acquiring a 1-st training image to an n-th training image corresponding to images or video frames obtained concurrently from each of a 1-st camera to an n-th camera that captures a target space at different angles from each other, a a process of inputting each of the 1-st training image to the n-th training image to a convolution module and instructing the convolution module to perform convolution operation on each of the 1-st training image to the n-th training image to thereby generate a 1-st feature map to an n-th feature map, (II) a process of inputting an i-th feature map to a homography attention module, wherein the i-th feature map represents each of the 1-st feature map to the n-th feature map when i varies from 1 to n, and instructing the homography attention module to perform processes of (i) (i-1) applying channel attention to the i-th feature map by using each of a 1-st channel attention weight to a d-th channel attention weight corresponding to each of a 1-st height plane to a d-th height plane that divides the target space into different heights, to thereby generate a 1-st channel attention map to a d-th channel attention map, each of which predicts each of channel attention scores that represents each degree of importance, corresponding to each of channels of the i-th feature map, for each of different homography transformations for the different heights, and (i-2) selecting top k channel attention scores for each of the 1-st channel attention map to the d-th channel attention map and then element-wise multiplying each of the top k channel attention scores with channels of the i-th feature map corresponding to each of the top k channel attention scores to thereby generate a 1-st channel refined feature map to a d-th channel refined feature map, each of which has k channels, (ii) (ii-1) applying spatial attention to each of the 1-st channel refined feature map to the d-th channel refined feature map by using each of a 1-st spatial attention weight to a d-th spatial attention weight corresponding to each of the 1-st height plane to the d-th height plane, to thereby generate a 1-st spatial attention map to a d-th spatial attention map, each of which indicates spatial features, included in the i-th feature map, whose degrees of importance for their respective homography transformations for their respective heights are greater than their corresponding threshold values, and (ii-2) element-wise multiplying each of the 1-st spatial attention map to the d-th spatial attention map with each of the 1-st channel refined feature map to the d-th channel refined feature map to thereby generate a 1-st spatial refined feature map to a d-th spatial refined feature map, and (iii) applying homography transformations to each of the 1-st spatial refined feature map to the d-th spatial refined feature map corresponding to the i-th feature map so as to project each of the 1-st spatial refined feature map to the d-th spatial refined feature map corresponding to the i-th feature map onto each of the 1-st height plane to the d-th height plane and thus generate a 1-st projected feature map to a d-th projected feature map corresponding to the i-th feature map, (III) a process of inputting the 1-st projected feature map to the d-th projected feature map corresponding to the i-th feature map to a BEV heatmap generator and instructing the BEV heatmap generator to perform a process of combining the 1-st projected feature map to the d-th projected feature map corresponding to the i-th feature map onto a BEV (Bird's Eye View) plane corresponding to the target space to thereby generate a BEV occupancy heatmap on which objects located in the target space detected by the 1-st camera to the n-th camera are indicated, and (IV) a process of generating a loss by referring to the BEV occupancy heatmap and its corresponding GT (Ground Truth) BEV occupancy heatmap, to thereby train at least one of the BEV heatmap generator, the homography attention module and the convolution module by using the loss.

13. The learning device of claim 12, wherein, at the process of (II), the processor performs or supports another device to perform a process of allowing the homography attention module to instruct a channel gate module included in the homography attention module to (i) apply the channel attention to the i-th feature map by using max pooling operation, average pooling operation and neural operation, wherein, as the channel attention, the channel gate module (i-1) performs the max pooling operation along spatial dimension on each of the channels of the i-th feature map to generate a (1_1)-st pooled feature map and performs the average pooling operation along the spatial dimension on each of the channels of the i-th feature map to generate a (1_2)-nd pooled feature map, and (i-2) inputs the (1_1)-st pooled feature map and the (1_2)-nd pooled feature map to a shared multi-layer perceptron (MLP), applies the neural operation to the (1_1)-st pooled feature map and the (1_2)-nd pooled feature map and thus generates the 1-st channel attention map to the d-th channel attention map, each predicting each of the channel attention scores, by using each of the 1-st channel attention weight to the d-th channel attention weight and (ii) perform softmax operation on the channel attention scores of each channel of the i-th feature map to normalize the channel attention scores to values between 0 and 1, select the top k channel attention scores for each of the 1-st channel attention map to the d-th channel attention map and then element-wise multiply each of the top k channel attention scores with the channels of the i-th feature map corresponding to each of the top k channel attention scores, thus to generate the 1-st channel refined feature map to the d-th channel refined feature map.

14. The learning device of claim 12, wherein, at the process of (II), the processor performs or supports another device to perform a process of allowing the homography attention module to instruct a spatial gate module included in the homography attention module to (i) apply the spatial attention to the 1-st channel refined feature map to the d-th channel refined feature map by using max pooling operation, average pooling operation, concatenation operation and convolution operation, wherein, as the spatial attention, the spatial gate module (i-1) performs the max pooling operation along channel dimension on each pixel of each of the 1-st channel refined feature map to the d-th channel refined feature map to generate a (2_1)-st pooled feature map for each of the 1-st channel refined feature map to the d-th channel refined feature map and performs the average pooling operation along the channel dimension on each pixel of each of the 1-st channel refined feature map to the d-th channel refined feature map to generate a (2_2)-nd pooled feature map for each of the 1-st channel refined feature map to the d-th channel refined feature map, and (i-2) performs the concatenation operation on the (2_1)-st pooled feature map and the (2_2)-nd pooled feature map to generate an intermediary feature map for each of the 1-st channel refined feature map to the d-th channel refined feature map and then performs the convolution operation on the intermediary feature map to thereby generate the 1-st spatial attention map to the d-th spatial attention map by using each of the 1-st spatial attention weight to the d-th spatial attention weight corresponding to each of the 1-st height plane to the d-th height plane, and (ii) element-wise multiply each of the 1-st spatial attention map to the d-th spatial attention map with each of the 1-st channel refined feature map to the d-th channel refined feature map to thereby generate the 1-st spatial refined feature map to the d-th spatial refined feature map.

15. The learning device of claim 12, wherein, at the process of (II), the processor performs or supports another device to perform a process of allowing the homography attention module to instruct a homography transformation module included in the homography attention module to homographically transform each of the 1-st spatial refined feature map to the d-th spatial refined feature map corresponding to the i-th feature map onto each of the 1-st height plane to the d-th height plane by applying a predetermined homography transformation matrix corresponding to the i-th feature map to each pixel on the 1-st spatial refined feature map to the d-th spatial refined feature map corresponding to the i-th feature map, to thereby generate the 1-st projected feature map to the d-th projected feature map corresponding to the i-th feature map.

16. The learning device of claim 12, wherein, at the process of (III), the processor performs or supports another device to perform a process of allowing the BEV heatmap generator to (i) concatenate the 1-st projected feature map to the d-th projected feature map corresponding to the i-th feature map to thereby generate a 1-st aggregated feature map to an n-th aggregated feature map corresponding to the 1-st training image to the n-th training image, and (ii) concatenate the 1-st aggregated feature map to the n-th aggregated feature map to generate an aggregated intermediary feature map and then apply convolution operation to the aggregated intermediary feature map to thereby generate the BEV occupancy heatmap that indicates BEV locations of each of objects included in the 1-st training image to the n-th training image.

17. The learning device of claim 12, wherein, at the process of (IV), the processor performs or supports another device to perform a process of generating the loss in a form of MSE (Mean Squared Error) loss or focal loss by referring to the BEV occupancy heatmap and its corresponding GT BEV occupancy heatmap, and a process of training at least one of the BEV heatmap generator, the homography attention module and the convolution module through back-propagation using the loss.

18. A test device for testing a homography attention module to perform multi-view object detection, comprising:
at least one memory that stores instructions; and
at least one processor configured to execute the instructions to perform or support another device to perform:
(I) on condition that a learning device has performed or supported another device to perform processes of (1) in response to acquiring a 1-st training image to an n-th training image corresponding to images or video frames obtained concurrently from each of a 1-st camera to an n-th camera that captures a target space for training at different angles from each other, inputting each of the 1-st training image to the n-th training image to a convolution module and instructing the convolution module to perform convolution operation on each of the 1-st training image to the n-th training image to thereby generate a 1-st feature map for training to an n-th feature map for training, (2) inputting an i-th feature map for training to a homography attention module, wherein the i-th feature map for training represents each of the 1-st feature map for training to the n-th feature map for training when i varies from 1 to n, and instructing the homography attention module to perform processes of (i) (i-1) applying channel attention to the i-th feature map for training by using each of a 1-st channel attention weight to a d-th channel attention weight corresponding to each of a 1-st height plane to a d-th height plane that divides the target space for training into different heights, to thereby generate a 1-st channel attention map for training to a d-th channel attention map for training, each of which predicts each of channel attention scores for training that represents each degree of importance, corresponding to each of channels of the i-th feature map for training, for each of different homography transformations for the different heights, and (i-2) selecting top k channel attention scores for training for each of the 1-st channel attention map for training to the d-th channel attention map for training and then element-wise multiplying each of the top k channel attention scores for training with channels of the i-th feature map for training corresponding to each of the top k channel attention scores for training to thereby generate a 1-st channel refined feature map for training to a d-th channel refined feature map for training, each of which has k channels, (ii) (ii-1) applying spatial attention to each of the 1-st channel refined feature map for training to the d-th channel refined feature map for training by using each of a 1-st spatial attention weight to a d-th spatial attention weight corresponding to each of the 1-st height plane to the d-th height plane, to thereby generate a 1-st spatial attention map for training to a d-th spatial attention map for training, each of which indicates spatial features, included in the i-th feature map for training, whose degrees of importance for their respective homography transformations for their respective heights are greater than their corresponding threshold values, and (ii-2) element-wise multiplying each of the 1-st spatial attention map for training to the d-th spatial attention map for training with each of the 1-st channel refined feature map for training to the d-th channel refined feature map for training to thereby generate a 1-st spatial refined feature map for training to a d-th spatial refined feature map for training, and (iii) applying homography transformations to each of the 1-st spatial refined feature map for training to the d-th spatial refined feature map for training corresponding to the i-th feature map for training so as to project each of the 1-st spatial refined feature map for training to the d-th spatial refined feature map for training corresponding to the i-th feature map for training onto each of the 1-st height plane to the d-th height plane and thus generate a 1-st projected feature map for training to a d-th projected feature map for training corresponding to the i-th feature map for training, (3) inputting the 1-st projected feature map for training to the d-th projected feature map for training corresponding to the i-th feature map for training to a BEV heatmap generator and instructing the BEV heatmap generator to perform a process of combining the 1-st projected feature map for training to the d-th projected feature map for training corresponding to the i-th feature map for training onto a BEV (Bird's Eye View) plane corresponding to the target space for training to thereby generate a BEV occupancy heatmap for training on which objects for training located in the target space for training detected by the 1-st camera to the n-th camera are indicated, and (4) generating a loss by referring to the BEV occupancy heatmap for training and its corresponding GT (Ground Truth) BEV occupancy heatmap, to thereby train at least one of the BEV heatmap generator, the homography attention module and the convolution module by using the loss, in response to acquiring a 1-st test image to an n-th test image corresponding to images or video frames obtained concurrently from each of the 1-st camera to the n-th camera that captures a target space for testing at different angles from each other, a process of inputting each of the 1-st test image to the n-th test image to the convolution module and instructing the convolution module to perform the convolution operation on each of the 1-st test image to the n-th test image to thereby generate a 1-st feature map for testing to an n-th feature map for testing, (II) a process of inputting an i-th feature map for testing to the homography attention module, wherein the i-th feature map for testing represents each of the 1-st feature map for testing to the n-th feature map for testing when i varies from 1 to n, and instructing the homography attention module to perform processes of (i) (i-1) applying the channel attention to the i-th feature map for testing by using each of the 1-st channel attention weight to the d-th channel attention weight corresponding to each of the 1-st height plane to the d-th height plane that divides the target space for testing into the different heights, to thereby generate a 1-st channel attention map for testing to a d-th channel attention map for testing, each of which predicts each of channel attention scores for testing that represents each degree of importance, corresponding to each of channels of the i-th feature map for testing, for each of different homography transformations for the different heights, and (i-2) selecting top k channel attention scores for testing for each of the 1-st channel attention map for testing to the d-th channel attention map for testing and then element-wise multiplying each of the top k channel attention scores for testing with channels of the i-th feature map for testing corresponding to each of the top k channel attention scores for testing to thereby generate a 1-st channel refined feature map for testing to a d-th channel refined feature map for testing, each of which has k channels, (ii) (ii-1) applying the spatial attention to each of the 1-st channel refined feature map for testing to the d-th channel refined feature map for testing by using each of the 1-st spatial attention weight to the d-th spatial attention weight corresponding to each of the 1-st height plane to the d-th height plane, to thereby generate a 1-st spatial attention map for testing to a d-th spatial attention map for testing, each of which indicates spatial features, included in the i-th feature map for testing, whose degrees of importance for their respective homography transformations for their respective heights are greater than their corresponding threshold values, and (ii-2) element-wise multiplying each of the 1-st spatial attention map for testing to the d-th spatial attention map for testing with each of the 1-st channel refined feature map for testing to the d-th channel refined feature map for testing to thereby generate a 1-st spatial refined feature map for testing to a d-th spatial refined feature map for testing, and (iii) applying the homography transformations to each of the 1-st spatial refined feature map for testing to the d-th spatial refined feature map for testing corresponding to the i-th feature map for testing so as to project each of the 1-st spatial refined feature map for testing to the d-th spatial refined feature map for testing corresponding to the i-th feature map for testing onto each of the 1-st height plane to the d-th height plane and thus generate a 1-st projected feature map for testing to a d-th projected feature map for testing corresponding to the i-th feature map for testing, and (III) a process of inputting the 1-st projected feature map for testing to the d-th projected feature map for testing corresponding to the i-th feature map for testing to the BEV heatmap generator and instructing the BEV heatmap generator to perform a process of combining the 1-st projected feature map for testing to the d-th projected feature map for testing corresponding to the i-th feature map for testing onto the BEV (Bird's Eye View) plane corresponding to the target space for testing to thereby generate a BEV occupancy heatmap for testing on which objects for testing located in the target space for testing detected by the 1-st camera to the n-th camera are indicated.

19. The test device of claim 18, wherein, at the process of (II), the processor performs or supports another device to perform a process of allowing the homography attention module to instruct a channel gate module included in the homography attention module to (i) apply the channel attention to the i-th feature map for testing by using max pooling operation, average pooling operation and neural operation, wherein, as the channel attention, the channel gate module (i-1) performs the max pooling operation along spatial dimension on each of the channels of the i-th feature map for testing to generate a (1_1)-st pooled feature map for testing and performs the average pooling operation along the spatial dimension on each of the channels of the i-th feature map for testing to generate a (1_2)-nd pooled feature map for testing, and (i-2) inputs the (1_1)-st pooled feature map for testing and the (1_2)-nd pooled feature map for testing to a shared multi-layer perceptron (MLP), applies the neural operation to the (1_1)-st pooled feature map for testing and the (1_2)-nd pooled feature map for testing and thus generates the 1-st channel attention map for testing to the d-th channel attention map for testing, each predicting each of the channel attention scores for testing, by using each of the 1-st channel attention weight to the d-th channel attention weight and (ii) perform softmax operation on the channel attention scores for testing of each channel of the i-th feature map for testing to normalize the channel attention scores for testing to values between 0 and 1, select the top k channel attention scores for testing for each of the 1-st channel attention map for testing to the d-th channel attention map for testing and then element-wise multiply each of the top k channel attention scores for testing with the channels of the i-th feature map for testing corresponding to each of the top k channel attention scores for testing, thus to generate the 1-st channel refined feature map for testing to the d-th channel refined feature map for testing.

20. The test device of claim 18, wherein, at the process of (II), the processor performs or supports another device to perform a process of allowing the homography attention module to instruct a spatial gate module included in the homography attention module to (i) apply the spatial attention to the 1-st channel refined feature map for testing to the d-th channel refined feature map for testing by using max pooling operation, average pooling operation, concatenation operation and convolution operation, wherein, as the spatial attention, the spatial gate module (i-1) performs the max pooling operation along channel dimension on each pixel of each of the 1-st channel refined feature map for testing to the d-th channel refined feature map for testing to generate a (2_1)-st pooled feature map for testing for each of the 1-st channel refined feature map for testing to the d-th channel refined feature map for testing and performs the average pooling operation along the channel dimension on each pixel of each of the 1-st channel refined feature map for testing to the d-th channel refined feature map for testing to generate a (2_2)-nd pooled feature map for testing for each of the 1-st channel refined feature map for testing to the d-th channel refined feature map for testing, and (i-2) performs the concatenation operation on the (2_1)-st pooled feature map for testing and the (2_2)-nd pooled feature map for testing to generate an intermediary feature map for testing for each of the 1-st channel refined feature map for testing to the d-th channel refined feature map for testing and then performs the convolution operation on the intermediary feature map for testing to thereby generate the 1-st spatial attention map for testing to the d-th spatial attention map for testing by using each of the 1-st spatial attention weight to the d-th spatial attention weight corresponding to each of the 1-st height plane to the d-th height plane, and (ii) element-wise multiply each of the 1-st spatial attention map for testing to the d-th spatial attention map for testing with each of the 1-st channel refined feature map for testing to the d-th channel refined feature map for testing to thereby generate the 1-st spatial refined feature map for testing to the d-th spatial refined feature map for testing.

21. The test device of claim 18, wherein, at the process of (II), the processor performs or supports another device to perform a process of allowing the homography attention module to instruct a homography transformation module included in the homography attention module to homographically transform each of the 1-st spatial refined feature map for testing to the d-th spatial refined feature map for testing corresponding to the i-th feature map for testing onto each of the 1-st height plane to the d-th height plane by applying a predetermined homography transformation matrix corresponding to the i-th feature map for testing to each pixel on the 1-st spatial refined feature map for testing to the d-th spatial refined feature map for testing corresponding to the i-th feature map for testing, to thereby generate the 1-st projected feature map for testing to the d-th projected feature map for testing corresponding to the i-th feature map for testing.

22. The test device of claim 18, wherein, at the process of (III), the processor performs or supports another device to perform a process of allowing the BEV heatmap generator to (i) concatenate the 1-st projected feature map for testing to the d-th projected feature map for testing corresponding to the i-th feature map for testing to thereby generate a 1-st aggregated feature map for testing to an n-th aggregated feature map for testing corresponding to the 1-st test image to the n-th test image, and (ii) concatenate the 1-st aggregated feature map for testing to the n-th aggregated feature map for testing to generate an aggregated intermediary feature map for testing and then apply convolution operation to the aggregated intermediary feature map for testing to thereby generate the BEV occupancy heatmap for testing that indicates BEV locations of each of objects for testing included in the 1-st test image to the n-th test image.

\* \* \* \* \*